US012631520B2

(12) United States Patent　　　(10) Patent No.:　US 12,631,520 B2

Guo et al.　　　(45) Date of Patent:　May 19, 2026

(54) OPTICAL FIBER MEASUREMENT SYSTEM

(71) Applicant: Huawei Technologies Co., Ltd., Shenzhen (CN)

(72) Inventors: Qiang Guo, Shenzhen (CN); Rui Zhou, Shenzhen (CN); Zhiqun Yang, Tianjin (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 118 days.

(21) Appl. No.: 18/506,628

(22) Filed: Nov. 10, 2023

(65) Prior Publication Data

US 2024/0077382 A1　　Mar. 7, 2024

Related U.S. Application Data

(63) Continuation of application No. PCT/CN2022/077509, filed on Feb. 23, 2022.

(30) Foreign Application Priority Data

May 13, 2021　(CN) ......................... 202110522805.2

(51) Int. Cl.
　　*G01M 11/00*　　　(2006.01)
　　*H04J 14/02*　　　(2006.01)
　　*H04B 10/077*　　(2013.01)

(52) U.S. Cl.
　　CPC ...... *G01M 11/3127* (2013.01); *G01M 11/319* (2013.01); *H04J 14/0305* (2023.08);
　　　　　　(Continued)

(58) Field of Classification Search
　　CPC ........... G01M 11/3127; G01M 11/319; G01M 11/3109; G01M 11/3136; H04J 14/0305;
　　　　　　(Continued)

(56) References Cited

U.S. PATENT DOCUMENTS 6,519,026 B1　2/2003　Holland
6,738,132 B2　5/2004　Sobe et al.
(Continued)

FOREIGN PATENT DOCUMENTS

CN　　103229432 A　　7/2013
CN　　110023732 A　　7/2019
(Continued)

OTHER PUBLICATIONS

Lu et al, Fading noise reduction in distributed vibration measurements utilizing multi-wavelength based Φ-OTDR, 2018, 26th International Conference on Optical Fiber Sensors (Year: 2018).*
(Continued)

*Primary Examiner* — Michelle M Iacoletti
*Assistant Examiner* — Judy Dao Tran
(74) *Attorney, Agent, or Firm* — Conley Rose, P.C.

(57) ABSTRACT

An optical fiber measurement system includes an optical time-domain reflectometer, a wavelength division multiplexer, and a signal generator. The signal generator sends a signal light ray to the wavelength division multiplexer. The optical time-domain reflectometer sends two measurement light rays whose wavelengths are respectively longer than and shorter than a wavelength of the signal light ray to the wavelength division multiplexer. The wavelength division multiplexer combines the two measurement light rays and the signal light ray, sends a combined light ray to an optical fiber, and sends a light ray returned by the optical fiber to the optical time-domain reflectometer, so that the optical time-domain reflectometer determines performance of the optical fiber based on the returned light ray.

20 Claims, 9 Drawing Sheets

(52) U.S. Cl.
    CPC ..... *G01M 11/3109* (2013.01); *G01M 11/3136* (2013.01); *G01N 2201/0886* (2013.01); *H04B 10/0775* (2013.01)

(58) Field of Classification Search
    CPC .......... H04J 14/052; G01N 2201/0886; H04B 10/0775; H04B 10/071
    See application file for complete search history.

(56) References Cited

U.S. PATENT DOCUMENTS

| | | | |
|---|---|---|---|
| 9,419,708 B2 | 8/2016 | Rad et al. | |
| 10,374,704 B2 | 8/2019 | Archambault et al. | |
| 10,432,302 B1 | 10/2019 | Delgado et al. | |
| 2010/0150547 A1* | 6/2010 | Xia ..................... | H04B 10/071 398/79 |

| | | | |
|---|---|---|---|
| 2017/0294959 A1 | 10/2017 | Archambault et al. | |
| 2018/0076884 A1* | 3/2018 | Archambault ..... | H04B 10/0775 |
| 2022/0360358 A1* | 11/2022 | Sakamoto .......... | H04B 10/2581 |

FOREIGN PATENT DOCUMENTS

| | | |
|---|---|---|
| JP | 2004354077 A | 12/2004 |
| WO | 2018095883 A1 | 5/2018 |

OTHER PUBLICATIONS

Yi Weng et al, "Space division multiplexing optical communication using few-mode fibers," Optical Fiber Technology, vol. 36, Jul. 1, 2017, total 26 pages.

* cited by examiner

OPTICAL FIBER MEASUREMENT SYSTEM

CROSS-REFERENCE TO RELATED APPLICATIONS

This application is a continuation of International Patent Application No. PCT/CN2022/077509 filed on Feb. 23, 2022, which claims priority to Chinese Patent Application No. 202110522805.2 filed on May 13, 2021. The disclosures of the aforementioned applications are hereby incorporated by reference in their entireties.

TECHNICAL FIELD

This application relates to the field of optical communication technologies, and in particular, to an optical fiber measurement system.

BACKGROUND

In the field of optical communication, an optical fiber with better transmission performance has less impact on a signal light ray transmitted in the optical fiber and facilitates nearly lossless transmission of the signal light ray to a receiving end. Therefore, how to accurately measure transmission performance of an optical fiber plays an important role in ensuring high-quality transmission of a signal light ray.

At present, a conventional method for measuring an optical fiber includes: sending a measurement light ray from one end of the optical fiber into the optical fiber, collecting a backward returned light ray generated when the measurement light ray is transmitted in the optical fiber, and obtaining information about signal attenuation in the optical fiber by using the backward returned light ray. However, when light rays of different wavelengths are transmitted in an optical fiber, a stimulated Raman scattering effect occurs. Specifically, power of a short-wavelength light ray is transferred to a long-wavelength light ray. Therefore, regardless of whether a wavelength of a measurement light ray is longer or shorter than a wavelength of a signal light ray, in this measurement manner, transmission of the measurement light ray is affected by the signal light ray because power is transferred. Consequently, a finally collected backward returned light ray is inaccurate, which is unfavorable for improving accuracy of a measurement result.

In conclusion, an optical fiber measurement system is required to improve accuracy of optical fiber measurement.

SUMMARY

This application provides an optical fiber measurement system to improve accuracy of optical fiber measurement.

This application provides an optical fiber measurement system, including a signal generator, a first optical time-domain reflectometer, and a wavelength division multiplexer. The signal generator is configured to send a signal light ray to the wavelength division multiplexer. The first optical time-domain reflectometer is configured to send a first measurement light ray and a second measurement light ray whose wavelengths are respectively longer than and shorter than a wavelength of the signal light ray to the wavelength division multiplexer. The wavelength division multiplexer is configured to: combine the first measurement light ray, the second measurement light ray, and the signal light ray, send a combined light ray to an optical fiber, and send a light ray returned by the optical fiber to the first optical time-domain reflectometer. The first optical time-domain reflectometer is further configured to determine performance of the optical fiber based on the returned light ray. In the foregoing design, through unidirectional transmission of two measurement light rays whose wavelengths are longer than and shorter than the wavelength of the signal light ray, power of the short-wavelength measurement light ray is transferred to the signal light ray, and power of the signal light ray is transferred to the long-wavelength measurement light ray. Therefore, performance of the optical fiber is comprehensively determined based on returned light rays of the two measurement light rays. This ensures that transferred power of the two measurement light rays in a measurement result is mutually offset, interference of various stimulated scattering effects to a measurement process is effectively eliminated, and accuracy of the measurement result is improved, without affecting normal service transmission of the signal light ray.

In a possible design, the first optical time-domain reflectometer may further send different first measurement light rays and different second measurement light rays into the optical fiber for a plurality of times, determine performance of the optical fiber in each measurement based on returned light rays in each measurement, and determine real performance of the optical fiber based on performance of the optical fiber in a plurality of measurements. For example, an average value of performance obtained in the plurality of measurements is used as the real performance of the optical fiber. In the design, the plurality of measurements are used to avoid an accidental error that exists when performance is determined by only one measurement. This helps further improve accuracy of the measurement result.

In a possible design, the signal light ray may be a single-wavelength signal light ray, or may alternatively be a multi-wavelength signal light ray. When the signal light ray is the single-wavelength signal light ray, that wavelengths of the first measurement light ray and the second measurement light ray are respectively longer than and shorter than the wavelength of the signal light ray may mean that the wavelength of the first measurement light ray is longer than a wavelength of the single-wavelength signal light ray, and the wavelength of the second measurement light ray is shorter than the wavelength of the single-wavelength signal light ray. When the signal light ray is the multi-wavelength signal light ray, that wavelengths of the first measurement light ray and the second measurement light ray are respectively longer than and shorter than the wavelength of the signal light ray may mean that the wavelength of the first measurement light ray is longer than a maximum wavelength of the multi-wavelength signal light ray, and the wavelength of the second measurement light ray is shorter than a minimum wavelength of the multi-wavelength signal light ray. In the design, a wavelength of one measurement light ray is set to be longer than the wavelength of the signal light ray (that is, a single wavelength or the maximum wavelength), and a wavelength of the other measurement light ray is set to be shorter than the wavelength of the signal light ray (that is, the single wavelength or the minimum wavelength). In this way, power transferred from the signal light ray to the long-wavelength measurement light ray and power transferred from the short-wavelength measurement light ray to the signal light ray can be mutually offset as much as possible, thereby helping reduce impact of the measurement process on normal service transmission.

In a possible design, both a wavelength difference between the wavelength of the first measurement light ray and the maximum wavelength and a wavelength difference between the minimum wavelength and the wavelength of the second measurement light ray may be within a preset Raman gain range, and the preset Raman gain range is a maximum wavelength difference that enables two optical signals of different wavelengths to generate an obvious stimulated Raman scattering effect. In the design, it is ensured that power is transferred between the first measurement light ray and the signal light ray and between the second measurement light ray and the signal light ray, thereby effectively improving a possibility of offsetting transferred power in the measurement result.

In a possible design, the first optical time-domain reflectometer may include a splitter and a processor. The splitter is configured to: split the returned light ray into a first returned light ray corresponding to the first measurement light ray and a second returned light ray corresponding to the second measurement light ray, and send the first returned light ray and the second returned light ray to the processor. The processor is configured to determine performance of the optical fiber based on the first returned light ray and the second returned light ray. In the design, the splitter can accurately split the returned light ray corresponding to the first measurement light ray and the returned light ray corresponding to the second measurement light ray. This helps the processor determine performance of each type of measurement light ray based on a returned light ray corresponding to each type of measurement light ray, so that performance of the optical fiber is comprehensively determined.

In a possible design, a wavelength difference between the wavelength of the first measurement light ray and a center wavelength of the signal light ray is the same as a wavelength difference between the center wavelength of the signal light ray and the wavelength of the second measurement light ray. In the design, each of the two measurement light rays is set to have a same wavelength difference with the wavelength of the signal light ray, so that the power transferred out from the short-wavelength measurement light ray is equivalent to the power transferred into the long-wavelength measurement light ray as much as possible. In this way, the transferred power of the two measurement light rays may be offset with a high probability by directly performing a weighted sum of performance curves corresponding to the two measurement light rays. This calculation manner is relatively simple, is easy to implement, and helps improve measurement efficiency.

In a possible design, the performance curve may be specifically a power attenuation curve. Light has a fixed propagation speed. Therefore, after the first optical time-domain reflectometer emits a measurement light ray, power of returned light rays received at different moments represents lost power at different positions of the optical fiber. The power attenuation curve can be obtained by collecting statistics about lost power at each position of the optical fiber, to accurately represent transmission attenuation performance of the optical fiber at each position.

In a possible design, the processor is specifically configured to: obtain a first performance curve of the optical fiber based on the first returned light ray, obtain a second performance curve of the optical fiber based on the second returned light ray, and perform a weighted sum of the first performance curve and the second performance curve, to obtain a target performance curve of the optical fiber. In the design, through unidirectional transmission of two measurement light rays whose wavelengths are respectively longer than and shorter than the wavelength of the signal light ray, the first optical time-domain reflectometer can determine performance of the optical fiber in a weighted sum manner. Compared with a manner of inputting measurement light rays of different frequencies at two ends to measure performance bidirectionally, the weighted sum calculation manner is simpler, is easy to implement, and helps improve measurement efficiency.

In a possible design, a ratio of a weight corresponding to the first performance curve to a weight corresponding to the second performance curve is positively correlated with a ratio of a frequency difference between a frequency of the signal light ray and a frequency of the first measurement light ray to a frequency difference between a frequency of the second measurement light ray and the frequency of the signal light ray. The frequency of the signal light ray may correspondingly be a frequency of the single-wavelength signal light ray or a center frequency of the multi-wavelength signal light ray. In the design, with reference to a forward linear correspondence between a relative frequency and transferred power consumption of two optical signals, corresponding weights are set based on frequency differences between the measurement light rays and the signal light ray. A weight of the first performance curve and a weight of the second performance curve can be set accordingly with reference to actual transferred power of the first measurement light ray and the second measurement light ray, so that two performance curves after a weighted sum respectively correspond to positive power transferred and negative power transferred, and values of the positive power transferred and negative power transferred are the same. This weight setting is more appropriate and accurate, can better correct impact of transferred power on two collected returned light rays, and further improve accuracy of the measurement result.

In a possible design, the signal generator may include K signal generation units. The K signal generation units are in a one-to-one correspondence with K bands, each of the K signal generation units is configured to send a signal light ray in a corresponding band to the wavelength division multiplexer. K is a positive integer greater than or equal to 2. The K bands may include but are not limited to: an 0 band (with a wavelength range of 1260 nanometers (nm) to 1360 nm), an E band (with a wavelength range of 1360 nm to 1460 nm), an S band (with a wavelength range of 1460 nm to 1530 nm), a C band (with a wavelength range of 1530 nm to 1565 nm), an L band (with a wavelength range of 1565 nm to 1625 nm), and the like. Therefore, the design is applicable to measurement of an optical fiber that transmits signals in a plurality of bands. When the optical fiber transmits signals in the plurality of bands, a scattering effect is more obvious. Therefore, a manner that can offset transferred power is used for measuring the optical fiber that transmits signals in the plurality of bands. This effectively improves accuracy of the measurement result.

In a possible design, the optical fiber measurement system may further include a wavelength division demultiplexer and a second optical time-domain reflectometer connected to the wavelength division demultiplexer. The wavelength division multiplexer and the wavelength division demultiplexer are respectively located at two ends of the optical fiber. In an implementation, the second optical time-domain reflectometer is configured to send a third measurement light ray and a fourth measurement light ray whose wavelengths are respectively longer than and shorter than the wavelength of the signal light ray to the wavelength division demultiplexer. The wavelength division demultiplexer is configured to: send the third measurement light ray and the fourth measurement light ray to the optical fiber, and send a light ray returned by the optical fiber to the second optical time-domain reflectometer. The second optical time-domain reflectometer is further configured to determine performance of the optical fiber in another direction based on the returned light ray. In the design, two optical time-domain reflectometers are respectively disposed at two ends of an optical fiber, so that the optical fiber can be measured in two directions. Loss information in the two directions at each position of the optical fiber is obtained. This helps accurately locate a fault point of the optical fiber.

In a possible design, wavelengths of the first measurement light ray, the second measurement light ray, the third measurement light ray, and the fourth measurement light ray are different. Therefore, measurements may be performed separately based on measurement light rays of different wavelengths disposed on two sides of the optical fiber. This ensures that a measurement light ray sent from an opposite side does not affect a returned light ray received by the optical time-domain reflectometer on one side, reduces mutual interference between the measurements in two directions, and effectively improves measurement accuracy in each direction.

In a possible design, there are a plurality of cases for an optical fiber measured by the first optical time-domain reflectometer.

For example: When the first optical time-domain reflectometer measures a first optical fiber, the optical fiber may be directly connected to the signal generator, and the first optical time-domain reflectometer uses a signal light ray emitted by the signal generator and two measurement light rays whose wavelengths are respectively longer than and shorter than a wavelength of the signal light ray, to accurately measure the first optical fiber.

When the first optical time-domain reflectometer measures a non-first optical fiber, the optical fiber measurement system may further include an optical fiber amplifier. An input end of the optical fiber amplifier is connected to an output end of a previous optical fiber (an input end of the previous optical fiber may be directly connected to the signal generator, or may be connected to the signal generator through another optical fiber), and an output end of the optical fiber amplifier is connected to the wavelength division multiplexer. The optical fiber amplifier is configured to: amplify power of a signal light ray transmitted from the previous optical fiber and send an amplified signal light ray to the wavelength division multiplexer. Therefore, the optical fiber amplifier is disposed to amplify power of weak signal light rays transmitted from a plurality of optical fibers, to compensate for an optical power loss caused by transmission through the plurality of optical fibers, thereby implementing long-distance signal transmission.

In a possible design, the optical fiber amplifier may include at least two amplifiers. An input end of the wavelength division demultiplexer is connected to an output end of a previous optical fiber. At least two output ends of the wavelength division demultiplexer are respectively connected to input ends of the at least two amplifiers, and output ends of the at least two amplifiers are connected to the wavelength division multiplexer. In an implementation, the wavelength division demultiplexer is configured to: split the signal light ray transmitted from the previous optical fiber into optical signals in at least two bands, and separately send the optical signals in at least two bands to the at least two amplifiers. The at least two amplifiers amplify power of received optical signals in bands, and then send amplified optical signals to the wavelength division multiplexer. In the design, power of a signal light ray in each band can be amplified more specifically. This helps set an amplification coefficient of the amplifier according to an actual requirement of each band.

In a possible design, the optical fiber may be a multi-core optical fiber, and there may be a plurality of first optical time-domain reflectometers and a plurality of wavelength division multiplexers. The plurality of wavelength division multiplexers are in a one-to-one correspondence with a plurality of fiber cores of the multi-core optical fiber, and the plurality of wavelength division multiplexers are in a one-to-one correspondence with the plurality of first optical time-domain reflectometers. In this case, the optical fiber measurement system may further include a first fan-in/fan-out device, configured to connect the plurality of wavelength division multiplexers and the multi-core optical fiber. The first fan-in/fan-out device may separately send light rays combined by the wavelength division multiplexers to fiber cores corresponding to the wavelength division multiplexers, and send light rays returned by the plurality of fiber cores to the wavelength division multiplexers corresponding to the plurality of fiber cores. Then, the wavelength division multiplexer sends a received light ray returned by the fiber core to the corresponding first optical time-domain reflectometer. The first optical time-domain reflectometer determines performance of the corresponding fiber core in the plurality of fiber cores based on the light ray returned by the fiber core. In the design, performance of each fiber core of the multi-core optical fiber in one direction can be measured.

It should be understood that unidirectional measurement processes of a plurality of fiber cores may be performed together. To be specific, a plurality of first optical time-domain reflectometers emit measurement light rays simultaneously, and the first fan-in/fan-out device simultaneously couples a plurality of combined light rays to the plurality of fiber cores. Alternatively, only one fiber core is measured each time. To be specific, only one first optical time-domain reflectometer emits a measurement light ray each time, and the first fan-in/fan-out device couples one combined light ray to one fiber core. Alternatively, a plurality of measurements may be performed, and a part of the fiber cores are measured each time. This is not specifically limited.

In a possible design, the optical fiber measurement system may further include the wavelength division demultiplexer and the second optical time-domain reflectometer. There may be a plurality of wavelength division demultiplexers and a plurality of second optical time-domain reflectometers. The plurality of wavelength division demultiplexers are in a one-to-one correspondence with the plurality of fiber cores of the multi-core optical fiber, and the plurality of second optical time-domain reflectometers are in a one-to-one correspondence with the plurality of wavelength division demultiplexers. The optical fiber measurement system may further include a second fan-in/fan-out device, configured to connect the plurality of wavelength division demultiplexers and the multi-core optical fiber. In this case, the second optical time-domain reflectometer may send two measurement light rays whose wavelengths are longer than and shorter than the wavelength of the signal light ray to the connected wavelength division demultiplexer. The wavelength division demultiplexer sends the two measurement light rays sent by the connected second optical time-domain reflectometer to the second fan-in/fan-out device. The second fan-in/fan-out device couples the two measurement light rays sent by the wavelength division demultiplexer to the fiber core corresponding to the wavelength division multiplexer, and sends light rays returned by the plurality of fiber cores to the wavelength division demultiplexers corresponding to the plurality of fiber cores. The wavelength division demultiplexer sends a received light ray returned by the fiber core to the corresponding second optical time-domain reflectometer. The second optical time-domain reflectometer determines performance of the corresponding fiber core in the plurality of fiber cores in another direction based on the light ray returned by the fiber core. In the design, performance of each fiber core of the multi-core optical fiber from another direction can be measured.

It should be understood that bidirectional measurement processes of a plurality of fiber cores may be performed together. To be specific, a plurality of first optical time-domain reflectometers and a plurality of second optical time-domain reflectometers emit measurement light rays simultaneously, the first fan-in/fan-out device simultaneously couples the measurement light rays emitted by the plurality of first optical time-domain reflectometers to the plurality of fiber cores in a forward direction, and the second fan-in/fan-out device simultaneously couples the measurement light rays emitted by the plurality of second optical time-domain reflectometers to the plurality of fiber cores in a reverse direction, to implement bidirectional measurement of the plurality of fiber cores simultaneously. Alternatively, only one fiber core is measured bidirectionally at a time. To be specific, only the first optical time-domain reflectometer and the second optical time-domain reflectometer corresponding to a to-be-measured fiber core emit measurement light rays each time, the first fan-in/fan-out device couples the measurement light ray emitted by the first optical time-domain reflectometer to the to-be-measured fiber core in the forward direction, and the second fan-in/fan-out device couples the measurement light ray emitted by the second optical time-domain reflectometer to the to-be-measured fiber core in the reverse direction. Alternatively, a plurality of measurements may be performed, and a part of the fiber cores are measured bidirectionally each time. This is not specifically limited.

In a possible design, the optical fiber may be a few-mode optical fiber, and there may be a plurality of first optical time-domain reflectometers and a plurality of wavelength division multiplexers. The plurality of wavelength division multiplexers are in a one-to-one correspondence with a plurality of modes of the few-mode optical fiber, and the plurality of wavelength division multiplexers are in a one-to-one correspondence with the plurality of first optical time-domain reflectometers. In this case, the optical fiber measurement system may further include a first mode multiplexer, configured to connect the plurality of wavelength division multiplexers and the few-mode optical fiber. The first mode multiplexer may convert light rays combined by the plurality of wavelength division multiplexers into light rays of different modes and then send the light rays of different modes to the few-mode optical fiber, and perform mode decomposition on light rays of different modes returned by the few-mode optical fiber, and then send light rays after mode decomposition to the corresponding wavelength division multiplexers. The plurality of wavelength division multiplexers return the light rays after mode decomposition to the corresponding first optical time-domain reflectometers. Each first optical time-domain reflectometer determines performance of a corresponding mode of the few-mode optical fiber based on the returned light ray after mode decomposition. In the design, performance of each mode of the few-mode optical fiber in one direction can be measured.

In the foregoing design, the plurality of wavelength division multiplexers may separately send, to the mode multiplexer, combined light rays in fundamental modes corresponding to the wavelength division multiplexers. The first mode multiplexer may convert the combined light ray sent by each wavelength division multiplexer into a light ray of a high-order mode. Converted light rays of high-order modes of the wavelength division multiplexers are weakly coupled (weak coupling means that mutual impact is relatively small and may be ignored, or may be eliminated by the optical time-domain reflectometer). Correspondingly, after the few-mode optical fiber returns light rays of high-order modes, the first mode multiplexer may perform mode decomposition on the light rays of high-order modes, to obtain returned light rays of fundamental modes corresponding to the wavelength division multiplexers, and send the returned light rays of fundamental modes to the wavelength division multiplexers. In this way, each wavelength division multiplexer may determine, based on the received returned light ray of the corresponding fundamental mode, performance of the fundamental mode, that is, performance of a converted light ray of a high-order mode corresponding to the fundamental mode.

It should be understood that unidirectional measurement processes of a plurality of modes may be performed together. To be specific, a plurality of first optical time-domain reflectometers emit measurement light rays simultaneously, and the first mode multiplexer simultaneously converts a plurality of combined light rays to obtain light rays of corresponding modes and then couples the light rays of corresponding modes into the optical fiber. Alternatively, only one mode is measured each time. To be specific, only one first optical time-domain reflectometer emits a measurement light ray each time, and the first mode multiplexer converts only one combined light ray to obtain a light ray of one mode and then couples the light ray of the mode into the optical fiber. Alternatively, a plurality of measurements may be performed, and a part of the modes are measured each time. This is not specifically limited.

In a possible design, the optical fiber measurement system may further include the wavelength division demultiplexer and the second optical time-domain reflectometer. There may be a plurality of wavelength division demultiplexers and a plurality of second optical time-domain reflectometers. The plurality of wavelength division demultiplexers are in a one-to-one correspondence with a plurality of modes of the few-mode optical fiber, and the plurality of second optical time-domain reflectometers are in a one-to-one correspondence with the plurality of wavelength division demultiplexers. The optical fiber measurement system may further include a second mode multiplexer, configured to connect the plurality of wavelength division demultiplexers and the few-mode optical fiber. In this case, the second optical time-domain reflectometer may send two measurement light rays whose wavelengths are longer than and shorter than the wavelength of the signal light ray to the connected wavelength division demultiplexer. The wavelength division demultiplexer sends the two measurement light rays sent by the connected second optical time-domain reflectometer to the second mode multiplexer. Then, the second mode multiplexer converts the two measurement light rays sent by the plurality of wavelength division demultiplexers into light rays of different modes, sends the light rays of different modes to the few-mode optical fiber, performs mode decomposition on light rays of different modes returned by the few-mode optical fiber, and sends light rays after mode decomposition to the corresponding wavelength division demultiplexers. The wavelength division demultiplexer sends a received returned light ray after mode decomposition corresponding to a mode to the corresponding second optical time-domain reflectometer. The second optical time-domain reflectometer determines performance of the corresponding mode of the few-mode optical fiber in another direction based on the returned light ray after mode decomposition. In the design, performance of each mode of the few-mode optical fiber from another direction can be measured.

It should be understood that bidirectional measurement processes of a plurality of modes may be performed together. To be specific, a plurality of first optical time-domain reflectometers and a plurality of second optical time-domain reflectometers emit measurement light rays simultaneously, the first mode multiplexer generates light rays of modes corresponding to the measurement light rays emitted by the plurality of first optical time-domain reflectometers, and then simultaneously couples the light rays of modes to the few-mode optical fiber in a forward direction, and the second mode multiplexer generates light rays of modes corresponding to the measurement light rays emitted by the plurality of second optical time-domain reflectometers, and then simultaneously couples the light rays of modes to the few-mode optical fiber in a reverse direction, to implement bidirectional measurement of the plurality of modes of the few-mode optical fiber simultaneously. Alternatively, only one mode is measured bidirectionally each time. To be specific, only the first optical time-domain reflectometer and the second optical time-domain reflectometer corresponding to a to-be-measured mode emit measurement light rays each time, the first mode multiplexer converts the measurement light ray emitted by the first optical time-domain reflectometer into a light ray of the to-be-measured mode and then couples the light ray of the to-be-measured mode to a to-be-measured fiber core in the forward direction, and the second mode multiplexer converts the measurement light ray emitted by the second optical time-domain reflectometer into a light ray of the to-be-measured mode and then couples the light ray of the to-be-measured mode to the to-be-measured fiber core in the reverse direction. Alternatively, a plurality of measurements may be performed, and a part of the modes are measured bidirectionally each time. This is not specifically limited.

In a possible design, returned light rays may include a Rayleigh scattering light ray or a Brillouin scattering light ray when measurement light rays are transmitted in the optical fiber. The first optical time-domain reflectometer may further change a scattering type by controlling power intensity of an output measurement light ray. For example, power of a measurement light ray is set to be less than 7 dBm, so that Rayleigh scattering instead of Brillouin scattering occurs in the optical fiber; and the power of the measurement light ray is set to be greater than 7 dBm, so that both Rayleigh scattering and Brillouin scattering occur in the optical fiber. In the design, a type of scattering occurring in the optical fiber is changed by adjusting intensity of the measurement light ray, and performance of the optical fiber under different scattering types can be measured according to actual requirements, thereby widening an application scope of optical fiber measurement.

BRIEF DESCRIPTION OF DRAWINGS

FIG. 11 is an example of a schematic diagram of transferring signals of different modes according to an embodiment of this application.

DESCRIPTION OF EMBODIMENTS

It should be noted that an optical fiber measurement solution in embodiments of this application may be used in an optical communication system. The optical communication system is a communication system that uses light as a carrier, uses an ultra-fine optical fiber drawn by using glass with relatively high purity as a transmission medium, and performs optical-to-electrical conversion to transmit information by using light. Common optical communication systems include but are not limited to the following cases. When classified by wavelengths, the optical communication systems may include a short-wavelength optical communication system (with an operating wavelength range of 0.8 μm to 0.9 μm), a long-wavelength optical communication system (with an operating wavelength range of 1.0 μm to 1.6 μm), and an ultra-long-wavelength optical communication system (with an operating wavelength of longer than 1.6 μm). When classified by optical fiber modes, the optical communication systems may include a single-mode optical communication system (optical signals of only one mode can be transmitted) and a few-mode optical communication system (optical signals of a plurality of modes can be transmitted). When classified by application scopes, the optical communication systems may include a public optical communication system (generally an optical communication system applied to a telecommunication operator) and a dedicated optical communication system (generally an optical communication system applied to a unit other than a telecommunication operator, for example, an optical communication system applied to the field of transportation or electric power).

The following describes technical solutions in embodiments of this application with reference to accompanying drawings in embodiments of this application. It should be understood that the following embodiments are merely some embodiments of this application rather than all embodiments of this application.

Figure 1:
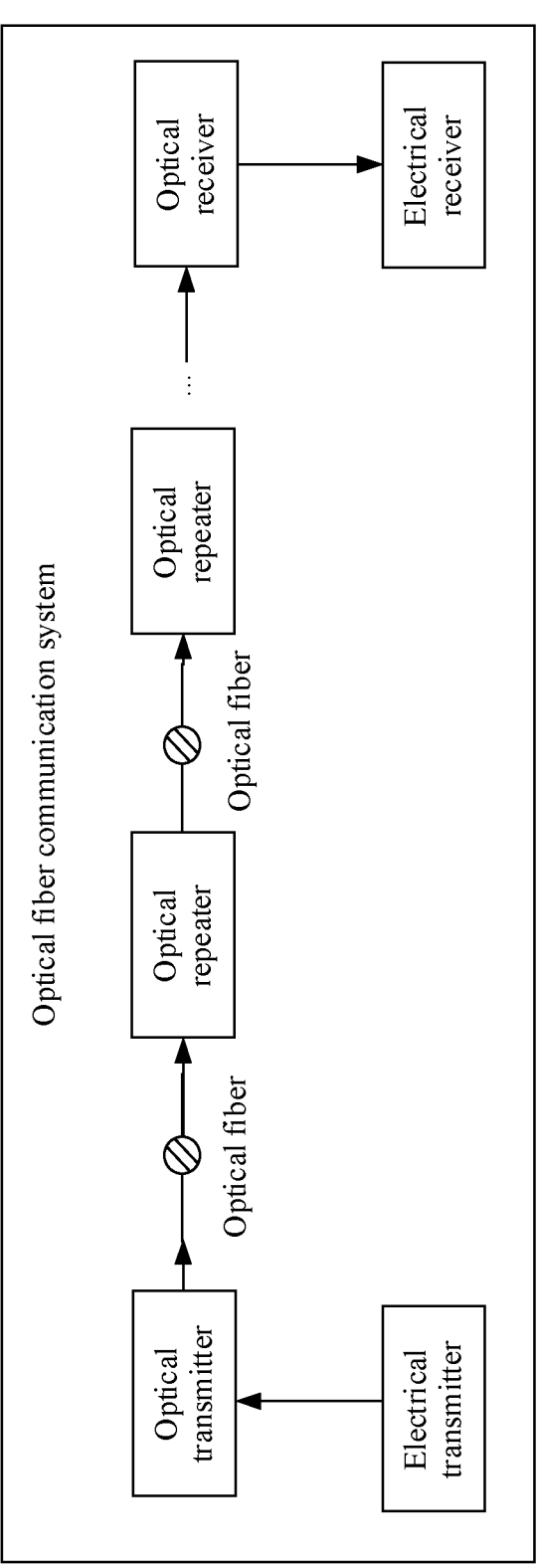
FIG. 1 is an example of a schematic diagram of an architecture of an optical communication system to which an embodiment of this application is applicable.

FIG. 1 is a schematic diagram of an architecture of a possible optical communication system to which an embodiment of this application is applicable. The system architecture shown in FIG. 1 includes an electrical transmitter, an optical transmitter, at least one optical fiber, at least one optical repeater, an optical receiver, an electrical receiver, and the like. In an implementation, the electrical transmitter or the electrical receiver generally may be a terminal device or a switch. The electrical transmitter is configured to send a pulse code modulation electrical signal. After the pulse code modulation electrical signal is sent to the optical transmitter, the optical transmitter may convert the pulse code modulation electrical signal into an optical pulse signal and couple the optical pulse signal to an optical fiber for transmission. The optical transmitter may include a semiconductor light source that can complete electrical-to-optical conversion, such as a semiconductor laser or a semiconductor light-emitting diode. Further, after the optical pulse signal is transmitted to the optical receiver over an optical fiber link, the optical receiver may convert the optical pulse signal into an electrical signal, restore the electrical signal to the original pulse code modulation electrical signal after performing an operation such as amplification on the electrical signal, and then send the original pulse code modulation electrical signal to the electrical receiver. The optical receiver may include an optoelectronic detector that can complete electrical-to-optical conversion, such as a photodiode.

In addition, the optical pulse signal usually has a specific loss when being transmitted over the optical fiber link. Therefore, to avoid an excessively large loss, which causes the optical pulse signal not to be transmitted to an optical receiving end, the entire optical fiber link may further be divided into a plurality of segments, and the optical repeater is disposed between any two optical fibers segments to relay the optical pulse signal. Generally, the optical repeater may be in two forms: one is a repeater in an optical-electrical-optical conversion form, and the other is an optical amplifier that directly amplifies an optical signal. The optical repeater in both forms can improve power of the optical pulse signal, to transmit the optical pulse signal to a longer distance. For example, it is assumed that there are 20 optical fibers in FIG. 1, and a distance of each optical fiber is 80 km. In this case, the optical communication system can transmit the optical pulse signal sent by the optical transmitter to the optical receiver 1600 km away.

In the optical communication system, if an optical fiber is faulty (for example, a connection fault), an optical pulse signal transmitted over an entire optical fiber link may be interrupted in the optical fiber. Consequently, communication quality of the entire optical communication system is affected. Therefore, in the optical communication system, accurate measurement of transmission performance of the optical fiber link plays an important role in high-quality transmission of the optical pulse signal. In view of this, this application provides an optical fiber measurement solution. In this solution, an optical time-domain reflectometer is disposed at one end or two ends of one or more optical fibers in the optical communication system, to measure performance of the one or more optical fibers unidirectionally or bidirectionally, and discover a faulty optical fiber in the optical communication system in a timely manner.

Before specific implementations are described, some terms that appear in the following are first described by using examples.

(1) Stimulated Scattering of Light: Stimulated Raman Scattering and Stimulated Brillouin Scattering In embodiments of this application, when high-strength laser light passes through an optical fiber, the high-strength laser light strongly interacts with material molecules in the laser light strongly interacts with material molecules in the optical fiber, so that a scattering process has a characteristic of stimulated emission. This nonlinear optical effect is referred to as a stimulated scattering effect of light. Stimulated scattering of light usually further exhibits a threshold characteristic. To be specific, stimulated scattering of light occurs merely at proper optical power, like a laser. At present, the following two types of stimulated scattering usually occur in the optical fiber:

Stimulated Raman scattering is a result of an interaction between pump light and silicon atom vibrations in the optical fiber. Stimulated Raman scattering is mainly represented by power transferred from short-wavelength light to long-wavelength light. Due to impact of stimulated Raman scattering, power of the short-wavelength light is attenuated. As a result, an optical signal-to-noise ratio (OSNR) of the short-wavelength light decreases, power of the long-wavelength light increases, and nonlinear interference increases, where the optical signal-to-noise ratio is a ratio of optical signal power to noise signal power within effective bandwidth of 0.1 nm of light. Generally, a threshold for generating stimulated Raman scattering is relatively small and is related to a material, a type, and parameters of the optical fiber. When power of the pump light transmitted in the optical fiber exceeds the threshold for generating stimulated Raman scattering in the optical fiber, the pump light may interact with silicon atoms in the optical fiber to generate stimulated Raman scattering.

Stimulated Brillouin scattering is a result of an interaction between the pump light and phonon vibrations in the optical fiber. Stimulated Brillouin scattering mainly causes crosstalk between channels and a channel energy loss. Stimulated Brillouin scattering usually causes a frequency shift of the pump light. To be specific, scattered light of another wavelength different from a wavelength of the pump light is stimulated. An offset between the another wavelength and the original wavelength is determined by a propagation constant and a material constant in the optical fiber, and may be obtained by using a prior experiment. A threshold for generating stimulated Brillouin scattering is higher than the threshold for generating stimulated Raman scattering. For 1550 nm pump light, when power of the pump light reaches 7 dBm to 8 dBm, the pump light may interact with the phonons in the optical fiber to generate stimulated Brillouin scattering.

(2) Optical Time-Domain Reflectometer (OTDR)

In embodiments of this application, the optical time-domain reflectometer is manufactured based on principles of backscattering and Fresnel reverse of pump light. Generally, the optical time-domain reflectometer obtains attenuation information of an optical fiber by using backscattering light generated by the pump light when the pump light is transmitted in the optical fiber, and may be used to measure optical fiber attenuation and connector loss, locate optical fiber faulty points, and understand loss distribution along a length of the optical fiber. Currently, there are mainly two types of optical time-domain reflectometers in the industry: an optical time-domain reflectometer that emits only one type of measurement light rays; and an optical time-domain reflectometer that simultaneously emits two types of measurement light rays. In this application, an optical time-domain reflectometer that simultaneously emits two types of measurement light rays is mainly used to complete optical fiber measurement. For a specific structure of the optical time-domain reflectometer, reference may be made to descriptions in the following Embodiment 1. Details are not described herein.

(3) Multi-Core Optical Fiber

In embodiments of this application, the multi-core optical fiber is an optical fiber that includes a plurality of fiber cores. The multi-core optical fiber can simultaneously transmit optical signals by using the plurality of fiber cores, thereby helping improve optical signal transmission efficiency and a quantity of transmitted signals.

(4) Few-Mode Optical Fiber (FMF)

In embodiments of this application, the few-mode optical fiber is an optical fiber in which signal flows of a plurality of modes may be transmitted simultaneously, and is also referred to as a multi-mode optical fiber. The few-mode optical fiber is a single-core optical fiber. Compared with a common single-mode single-core optical fiber, the few-mode optical fiber may have a larger mode area and allows parallel transmission of information flows of different modes in independent spaces. This helps improve a communication capacity of the optical fiber.

(5) Wavelength-Division Multiplexing (WDM)

In embodiments of this application, wavelength division multiplexing is a technology in which two or more optical carriers of different wavelengths are combined at a transmitting end and then coupled to a same optical fiber for transmission. Generally, at a receiving end, combined optical carriers of various wavelengths further need to be split by using a wavelength division demultiplexer. Dense wavelength-division multiplexing (DWDM) is a special case of wavelength division multiplexing. DWDM is usually used to combine optical carriers of two or more bands into one optical fiber, so that a plurality of orthogonal optical carriers that are closely arranged may be transmitted in frequency domain. In addition, a wavelength spacing of the plurality of optical carriers in dense wavelength division multiplexing is far shorter than a wavelength spacing of the plurality of optical carriers in non-dense wavelength division multiplexing. By using dense wavelength division multiplexing, more optical carriers can be transmitted in a same transmission window. This helps improve bandwidth utilization.

(6) Center Wavelength

In wavelength division multiplexing, a plurality of optical carriers are usually sent at a specific wavelength spacing, and each optical carrier occupies a wavelength width. A center wavelength may be considered as an average wavelength of a minimum wavelength and a maximum wavelength of the plurality of optical carriers. For example, if optical carriers in a band range of 1530 nm to 1565 nm are sent at a wavelength spacing of 0.4 nm, a total of 80 optical carriers may be sent. If a minimum wavelength of the 80 optical carriers is 1530 nm and a maximum wavelength of the 80 optical carriers is 1565 nm, the center wavelength is an average wavelength of 1530 nm and 1565 nm, namely, 1547.5 nm.

In dense wavelength division multiplexing, when optical carriers of a plurality of bands are transmitted in a same optical fiber simultaneously, a quantity of wavelength channels in the optical fiber is greatly increased when compared with that in non-dense wavelength division multiplexing. In this case, a signal spectrum width and total incident power in the optical fiber are also increased accordingly, and severe stimulated Raman scattering occurs for the optical carriers of the plurality of bands during transmission. Experiment results show that intensity of stimulated Raman scattering in dense wavelength division multiplexing increases exponentially with an increase of a quantity of bands. In this case, more bands of optical carriers transmitted in dense wavelength division multiplexing indicate greater impact of stimulated Raman scattering on the optical carriers during transmission, greater power loss of short-wavelength optical carriers, more obvious nonlinear interference of long-wavelength optical carriers, and more unfavorable to transmission performance and a transmission distance of an optical fiber. Therefore, how to accurately measure performance of an optical fiber in dense wavelength division multiplexing plays an important role in detecting an optical fiber fault in dense wavelength division multiplexing in a timely manner.

In view of this, an embodiment of this application provides an optical fiber measurement system, configured to send a signal light ray and two measurement light rays whose wavelengths are longer than and shorter than a wavelength of the signal light ray to an optical fiber simultaneously from a same direction, so that power transferred between each of the two measurement light rays and the signal light ray may be offset as much as possible without affecting normal services of the optical fiber, thereby improving accuracy of a measurement result.

The following clearly and describes the technical solutions in embodiments of this application with reference to the accompanying drawings in embodiments of this application. It should be understood that, in the following descriptions of this application, "a plurality of" may be understood as "at least two". Words such as "first" and "second" are merely used for distinction and description, and shall not be understood as an indication or implication of relative importance or an indication or implication of an order. In addition, in embodiments of this application, "connection" means an electrical connection, and a connection between two electrical elements may be a direct or indirect connection between the two electrical elements. For example, a connection between A and B may represent that A and B are directly connected to each other, or A and B are indirectly connected to each other through one or more other electrical elements. For example, the connection between A and B may also represent that A is directly connected to C, C is directly connected to B, and A and B are connected to each other through C.

It should be noted that a communication end in the following is a port that may be used as an input end or an output end. The communication end is merely an example name, and may have another name in another solution, for example, may also be referred to as an input/output end. This is not specifically limited.

Embodiment 1

Figure 2:
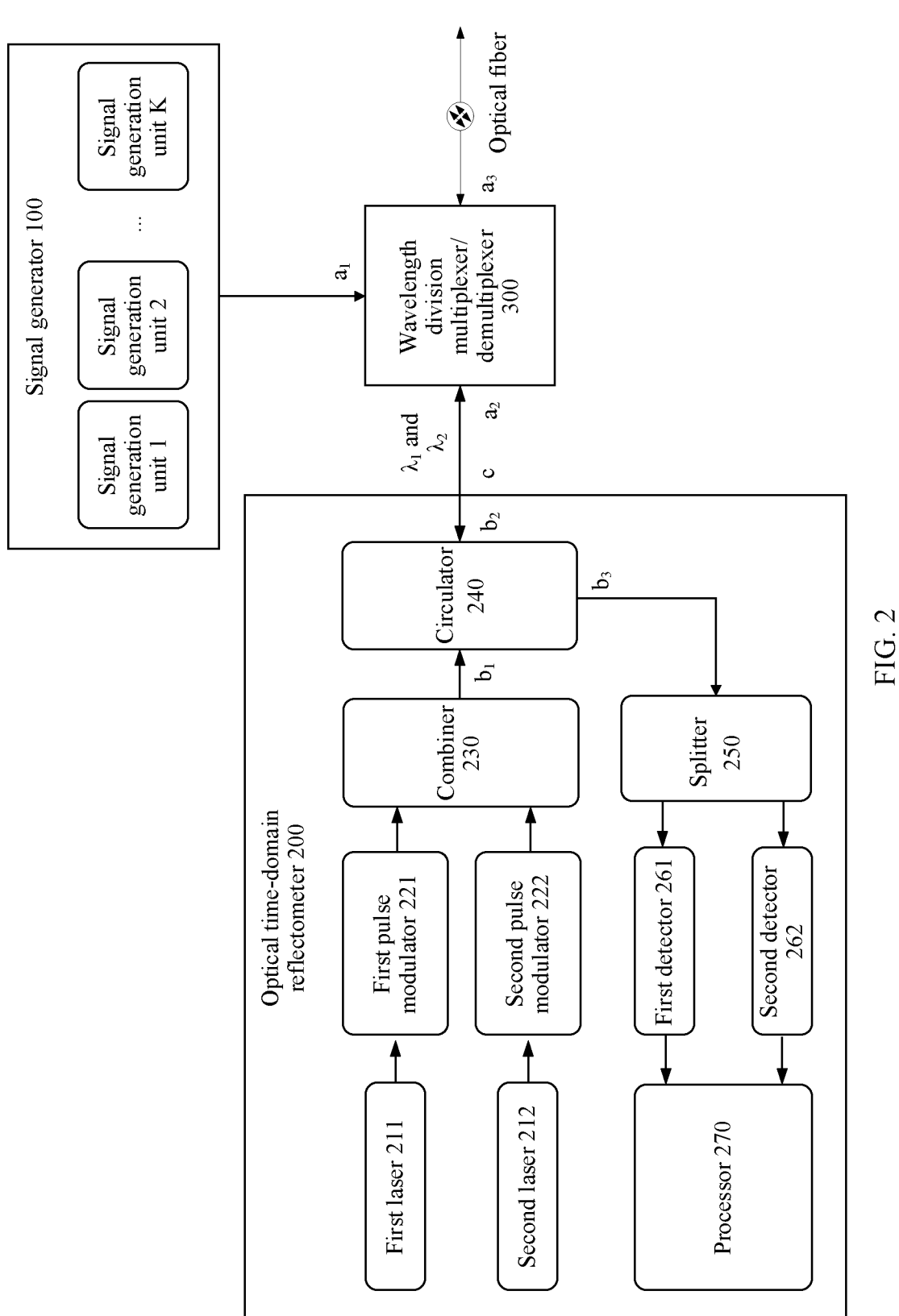
FIG. 2 is an example of a schematic diagram of an architecture of an optical fiber measurement system according to an embodiment of this application.

FIG. 2 is an example of a schematic diagram of an architecture of an optical fiber measurement system according to an embodiment of this application. As shown in FIG. 2, the architecture of the system includes a signal generator 100, an optical time-domain reflectometer 200 (namely, a first optical time-domain reflectometer), and a wavelength division multiplexer 300. The signal generator 100 in this example may correspondingly be the optical transmitter in FIG. 1. An output end of the signal generator 100 is connected to a communication end $a_1$ of the wavelength division multiplexer 300, a communication end c of the optical time-domain reflectometer 200 is connected to a communication end $a_2$ of the wavelength division multiplexer 300, and a communication end $a_3$ of the wavelength division multiplexer 300 is connected to an optical fiber. When performance of the optical fiber needs to be measured, the signal generator 100 may emit a signal light ray to the communication end $a_1$ of the wavelength division multiplexer 300, and the optical time-domain reflectometer 200 may emit a first measurement light ray with a wavelength of $\lambda_1$ and a second measurement light ray with a wavelength of $\lambda_2$ to the communication end $a_2$ of the wavelength division multiplexer 300. $\lambda_1$ and $\lambda_2$ are respectively longer than and shorter than a wavelength of the signal light ray. For example, $\lambda_1$ is longer than the wavelength of the signal light ray, and $\lambda_2$ is shorter than the wavelength of the signal light ray. Alternatively, $\lambda_1$ is shorter than the wavelength of the signal light ray, and $\lambda_2$ is longer than the wavelength of the signal light ray. The wavelength division multiplexer 300 may combine the signal light ray that is received from the communication end $a_1$ and the first measurement light ray and the second measurement light ray that are received from the communication end $a_2$, send a combined light ray to the optical fiber through the communication end $a_3$, receive, through the communication end $a_3$, a light ray returned when the combined light ray is transmitted in the optical fiber, and send the returned light ray to the optical time-domain reflectometer 200 through the communication end $a_2$. The optical time-domain reflectometer 200 may further determine performance of the optical fiber based on the returned light ray.

For ease of describing a solution, it is assumed below that the wavelength $\lambda_1$ of the first measurement light ray is longer than the wavelength of the signal light ray, and the wavelength $\lambda_2$ of the second measurement light ray is shorter than the wavelength of the signal light ray.

In this embodiment of this application, the signal light ray may be a single-wavelength signal light ray, or may be a multi-wavelength signal light ray.

When the signal light ray is the single-wavelength (for example, 1530 nm) signal light ray, the wavelength $\lambda_1$ of the first measurement light ray may be a wavelength longer than 1530 nm, for example, 1550 nm, and the wavelength $\lambda_2$ of the second measurement light ray may be a wavelength shorter than 1530 nm, for example, 1500 nm. In this way, when the 1530 nm signal light ray, the 1550 nm measurement light ray, and the 1500 nm measurement light ray are transmitted in the optical fiber simultaneously, power of the 1500 nm measurement light ray is transferred to the 1530 nm signal light ray, and power of the 1530 nm signal light ray is transferred to the 1550 nm measurement light rays. In this case, the power transferred into the 1530 nm signal light ray and the power transferred out from the 1530 nm signal light ray can offset each other with a high probability. It can be seen that this manner not only ensures measurement in a normal signal light ray transmission process, but also helps eliminate impact of the measurement process on normal service signal transmission of the optical fiber. In addition, although both the power transferred by the 1500 nm measurement light ray and the power transferred by the 1550 nm measurement light ray affect the returned light ray, the two measurement light rays have opposite power transfer. Performance of the optical fiber is determined by performing a weighted sum of returned light rays of the two measurement light rays. This eliminates impact of power transferred by the two measurement light rays on a measurement result, and helps improve accuracy of the measurement result. It can be learned that this measurement manner can improve accuracy of optical fiber measurement while measuring an optical fiber online.

When the signal light ray is the multi-wavelength (for example, 1530 nm and 1555 nm) signal light ray, the wavelength $\lambda_1$ of the first measurement light ray may be a wavelength longer than a maximum wavelength of 1555 nm in a plurality of wavelengths, for example, 1570 nm, and the wavelength $\lambda_2$ of the second measurement light ray may be a wavelength shorter than a minimum wavelength of 1530 nm in the plurality of wavelengths, for example, 1500 nm. In this way, when the 1530 nm signal light ray, the 1555 nm signal light ray, the 1570 nm measurement light ray, and the 1500 nm measurement light ray are simultaneously transmitted in the optical fiber, power of the 1500 nm measurement light ray is transferred to the 1530 nm signal light ray, power of the 1530 nm signal light ray is transferred to the 1555 nm signal light ray, and power of the 1555 nm signal light ray is transferred to the 1570 nm measurement light ray. In this case, the power of the 1500 nm measurement light ray transferred into the 1530 nm signal light ray and the power of the 1555 nm signal light ray transferred into the 1570 nm measurement light ray can offset each other. This helps reduce impact of the measurement process on normal transmission of the two signal light rays and improve measurement accuracy. Further, power transfer also exists in a normal service transmission process of the multi-wavelength signal light ray. The measurement only offsets the power transferred into the 1530 nm signal light ray and the power transferred out from the 1555 nm signal light ray, and does not affect power transferred between the two signal light rays. In other words, the measurement manner can also accurately measure a measurement result affected by power transfer of the signal light ray, and the measurement result can accurately represent a real transmission scenario.

In this embodiment of this application, the multi-wavelength signal light ray may be in a range of one band, or may be in a range of a plurality of bands. When the multi-wavelength signal light ray is in the range of a plurality of bands, for example, still with reference to FIG. 2, the signal generator 100 may include K signal generation units (a signal generation unit 1, a signal generation unit 2, . . . , and a signal generation unit K shown in FIG. 2, where K is a positive integer greater than or equal to 2). The K signal generation units are in a one-to-one correspondence with K bands, and output ends of the K signal generation units may be respectively connected to a plurality of ports of the communication end $a_1$ of the wavelength division multiplexer 300. Each signal generation unit is configured to send a signal light ray in a corresponding band to the wavelength division multiplexer 300. The K bands may be selected from the following bands: an O band (with a wavelength range of 1260 nm to 1360 nm), an E band (with a wavelength range of 1360 nm to 1460 nm), an S band (with a wavelength range of 1460 nm to 1530 nm), a C band (with a wavelength range of 1530 nm to 1565 nm), an L band (with a wavelength range of 1565 nm to 1625 nm), and the like. Considering that signal light rays of different bands have different losses during transmission, and transmission losses corresponding to the C band and the L band are the smallest, preferably, the K bands may be the C band+the L band. However, it is not excluded that the K bands will develop to the C band+the L band+the S band in the future. It can be learned that an optical fiber measurement solution in this application is applicable to not only measurement of an optical fiber that transmits single-wavelength signals, but also measurement of an optical fiber that transmits signals in a plurality of bands. A stimulated scattering effect of the optical fiber is more obvious when the optical fiber transmits the signals in a plurality of bands. Therefore, a manner that can offset power transfer is used to measure an optical fiber in an optical communication system that transmits the signals in a plurality of bands. This effectively improves accuracy of the measurement result.

In an optional implementation, a wavelength difference $\lambda_1 - \lambda_{max}$ between the wavelength $\lambda_1$ of the first measurement light ray and a maximum wavelength of the signal light ray (it is assumed that the maximum wavelength is $\lambda_{max}$, which corresponds to a single wavelength of the single-wavelength signal light ray, or a maximum wavelength of the multi-wavelength signal light ray, or a maximum wavelength of a signal light ray in a maximum band of signal light rays in a plurality of bands), and a wavelength difference $\lambda_{min} - \lambda_2$ between a minimum wavelength of the signal light ray (it is assumed that the minimum wavelength is $\lambda_{min}$, which corresponds to the single wavelength of the single-wavelength signal light ray, or a minimum wavelength of the multi-wavelength signal light ray, or a minimum wavelength of a signal light ray in a minimum band of signal light rays in a plurality of bands) and the wavelength of the second measurement light ray $\lambda_2$ may fall within a preset Raman gain range. The preset Raman gain range is a maximum wavelength difference that enables two optical signals of different wavelengths to generate an obvious stimulated Raman scattering effect, and may be generally set to a value from 90 nm to 110 nm. For example, when the preset Raman gain range is set to 100 nm and the signal light ray includes two types of signal light rays whose wavelengths are 1530 nm and 1555 nm, the wavelength $\lambda_1$ of the first measurement light ray may be set to a wavelength longer than 1555 nm and shorter than or equal to 1655 nm, and the wavelength $\lambda_2$ of the second measurement light ray may be set to a wavelength longer than 1430 nm and shorter than or equal to 1530 nm. This ensures that power is transferred between the first measurement light ray and the signal light ray and between the second measurement light ray and the signal light ray, and a possibility of offsetting transferred power is improved.

In an optional implementation, when the wavelength difference between each of the two measurement light rays and the signal light ray is within the preset Raman gain range, power transfer occurs between the two measurement light rays and the signal light ray. After receiving the returned light ray sent by the wavelength division multiplexer 300, the optical time-domain reflectometer 200 may further separately obtain a first returned light ray corresponding to the first measurement light ray and a second returned light ray corresponding to the second measurement light ray from the returned light ray and determine performance of the optical fiber based on the first returned light ray and the second returned light ray. Further, optionally, determining performance of the optical fiber may include: A processor obtains a first performance curve corresponding to the optical fiber based on the first returned light ray, obtains a second performance curve corresponding to the optical fiber based on the second returned light ray, and then performs a weighted sum of the first performance curve and the second performance curve to obtain a target performance curve of the optical fiber. The first performance curve corresponds to the first measurement light ray with power transferred in, and the second performance curve corresponds to the second measurement light ray with power transferred out. To enable the acquired target performance curve to offset impact of the transferred-in power of the first measurement light ray and the transferred-out power of the second measurement light ray as much as possible, a correlation between a weight corresponding to the first performance curve and a weight corresponding to the second performance curve may be set based on a correlation between the transferred-in power of the first measurement light ray and the transferred-out power of the second measurement light ray. For example, a larger weight is set for a performance curve corresponding to a measurement light ray with much power transferred in or transferred out, and a smaller weight is set for a performance curve corresponding to a measurement light ray with little power transferred in or transferred out, so that two performance curves after a weighted sum can respectively correspond to positive power transferred and negative power transferred, and values of the positive power transferred and the negative power transferred are the same. The weighted sum of the two performance curves can correct impact of transferred power on collected two returned light rays and effectively improve accuracy of the measurement result.

Figure 3:
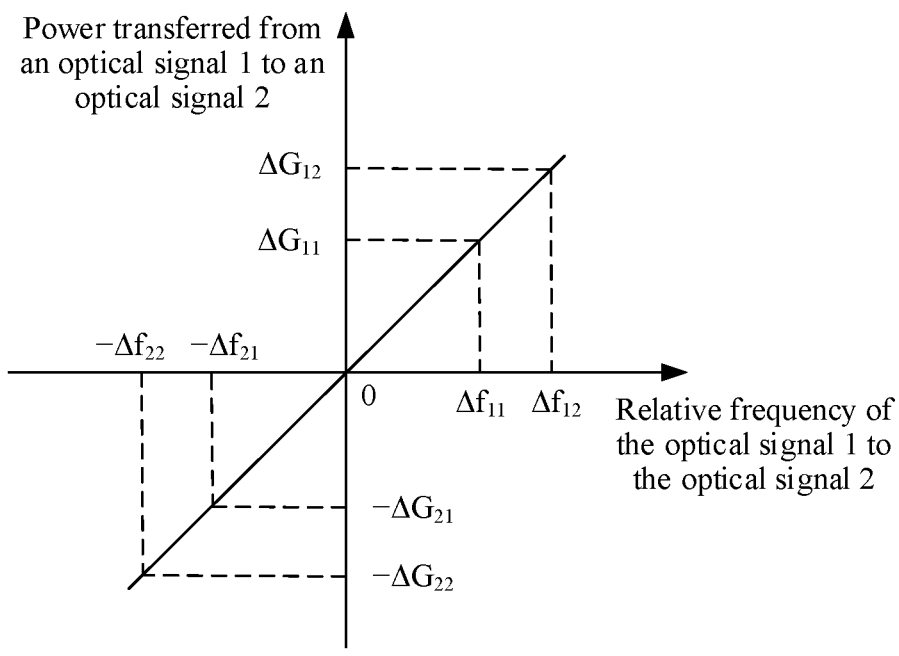
FIG. 3 is an example of a diagram of a correspondence between power transfer and a relative frequency according to an embodiment of this application.

Further, generally, when a wavelength difference between two optical signals is within the preset Raman gain range, there is a positive correlation between power transferred by the two optical signals in a unidirectional transmission process and a relative frequency between the two optical signals. The relative frequency between the two optical signals is a frequency difference between frequencies of the two signals. For example, FIG. 3 is an example of a diagram of a correspondence between power transfer and a relative frequency according to an embodiment of this application. As shown in FIG. 3, when a relative frequency between an optical signal 1 and an optical signal 2 is 0, wavelengths of the optical signal 1 and the optical signal 2 are the same, and no power is transferred between the optical signal 1 and the optical signal 2. When the relative frequency of the optical signal 1 to the optical signal 2 is a positive value, a frequency of the optical signal 1 is higher than a frequency of the optical signal 2, a wavelength of the optical signal 1 is shorter than a wavelength of the optical signal 2, and the optical signal 1 transfers power to the optical signal 2. In addition, a higher relative frequency of the optical signal 1 to the optical signal 2 indicates that the wavelength of the optical signal 1 is much shorter than the wavelength of the optical signal 2, and the optical signal 1 transfers more power to the optical signal 2. For example, as shown in FIG. 3, when the relative frequency of the optical signal 1 to the optical signal 2 is $\Delta f_{11}$, the power transferred from the optical signal 1 to the optical signal 2 is $\Delta G_{11}$. When the relative frequency of the optical signal 1 to the optical signal 2 is $\Delta f_{12}$, the power transferred from the optical signal 1 to the optical signal 2 is $\Delta G_{12}$. $\Delta f_{11}$ is lower than $\Delta f_{12}$, and $\Delta G_{11}$ is smaller than $\Delta G_{12}$ accordingly. When the relative frequency of the optical signal 1 to the optical signal 2 is a negative value, a frequency of the optical signal 1 is lower than a frequency of the optical signal 2, a wavelength of the optical signal 1 is longer than a wavelength of the optical signal 2, and the optical signal 2 transfers power to the optical signal 1. In addition, a smaller value of the relative frequency of the optical signal 1 to the optical signal 2 indicates that the wavelength of the optical signal 1 is much longer than the wavelength of the optical signal 2, and the optical signal 2 transfers more power to the optical signal 1. For example, as shown in FIG. 3, when the relative frequency of the optical signal 1 to the optical signal 2 is $-\Delta f_{21}$, the power transferred from the optical signal 2 to the optical signal 1 is $\Delta G_{21}$. When the relative frequency of the optical signal 1 to the optical signal 2 is $-\Delta f_{22}$, the power transferred from the optical signal 2 to the optical signal 1 is $\Delta G_{22}$. $\Delta f_{21}$ is lower than $\Delta f_{22}$, and $\Delta G_{21}$ is smaller than $\Delta G_{22}$ accordingly. It can be learned that the power transferred between the two optical signals is actually in a positive correlation with the relative frequency between the two optical signals.

According to the foregoing principle, when the weight corresponding to the first performance curve and the weight corresponding to the second performance curve are set based on the correlation between the transferred-in power of the first measurement light ray and the transferred-out power of the second measurement light ray, a ratio of the weight of the first performance curve to the weight of the second performance curve may further be set, which is in direct proportion to a ratio of a relative frequency of the signal light ray to the first measurement light ray to a relative frequency of the second measurement light ray to the signal light ray. The relative frequency of the signal light ray to the first measurement light ray is a frequency difference between a center frequency of the signal light ray (corresponding to a single frequency of the single-wavelength signal light ray or a center frequency of the multi-wavelength signal light ray, and similar to a center wavelength, the center frequency of the multi-wavelength signal light ray corresponds to an average frequency of a minimum frequency and a maximum frequency of the multi-wavelength signal light ray) and a frequency of the first measurement light ray. The relative frequency of the second measurement light ray to the signal light ray is a frequency difference between a frequency of the second measurement light ray and a frequency of the signal light ray. In this way, a higher relative frequency of the second measurement light ray to the signal light ray and a lower relative frequency of the signal light ray to the first measurement light ray indicate that the weight corresponding to the first performance curve is much smaller and the weight corresponding to the second performance curve is much larger. Therefore, the first performance curve after a weighted sum can make up for an insufficient signal because much power of the second measurement light ray is transferred to the signal light ray, and can further reduce an excess signal because much power of the signal light ray is transferred to the first measurement light ray. This helps equalize the first performance curve and the second performance curve to a same power transfer value. It can be learned that, through unidirectional transmission of two measurement light rays whose wavelengths are respectively longer than and shorter than the wavelength of the signal light ray, the optical time-domain reflectometer can determine performance of the optical fiber in a weighted sum manner. Compared with a manner of inputting measurement light rays of different frequencies at two ends to measure performance bidirectionally, the weighted sum calculation manner is simpler, is easy to implement, and helps improve measurement efficiency.

For example, to completely offset the power transferred between each of the two measurement light rays and the signal light ray, preferably, a ratio of the weight of the first performance curve to the weight of the second performance curve may further be set, which is equal to a ratio of a relative frequency of the signal light ray to the first measurement light ray to a relative frequency of the second measurement light ray to the signal light ray. In this way, the weight of the first performance curve and the weight of the second performance curve are set accordingly with reference to real transferred power of the first measurement light ray and the second measurement light ray, so that the first performance curve and the second performance curve can be accurately aligned with a same power transfer value. This weight setting is appropriate and helps obtain a most accurate measurement result.

It should be noted that "a ratio of the weight of the first performance curve to the weight of the second performance curve may further be set, which is in direct proportion to a ratio of a relative frequency of the signal light ray to the first measurement light ray to a relative frequency of the second measurement light ray to the signal light ray" in the foregoing content may alternatively be that a ratio of the weight of the first performance curve to the weight of the second performance curve may further be set, which is in direct proportion to a ratio of a relative wavelength of the first measurement light ray to the signal light ray to a relative wavelength of the signal light ray to the second measurement light ray. The relative wavelength of the first measurement light ray to the signal light ray is a wavelength difference between the wavelength $\lambda_1$ of the first measurement light ray and a center wavelength (corresponding to a single wavelength of the single-wavelength signal light ray or a center wavelength of the multi-wavelength signal light ray) of the signal light ray. The relative wavelength of the signal light ray to the second measurement light ray is a wavelength difference between the center wavelength of the signal light ray and the wavelength $\lambda_2$ of the second measurement light ray. The wavelength of the first measurement light ray is longer than the wavelength of the signal light ray, that is, the frequency of the first measurement light ray is lower than the frequency of the signal light ray. Therefore, both a wavelength difference obtained by subtracting the wavelength of the signal light ray from the wavelength of the first measurement light ray and a frequency difference obtained by subtracting the frequency of the first measurement light ray from the frequency of the signal light ray are positive values. In other words, both the relative wavelength of the first measurement light ray to the signal light ray and the relative frequency of the signal light ray to the first measurement light ray are positive values. Correspondingly, the wavelength of the second measurement light ray is shorter than the wavelength of the signal light ray, that is, the frequency of the second measurement light ray is higher than the frequency of the signal light ray. Therefore, both a wavelength difference obtained by subtracting the wavelength of the second measurement light ray from the wavelength of the signal light ray and a frequency difference obtained by subtracting the frequency of the signal light ray from the frequency of the second measurement light ray are positive values, that is, both the relative wavelength of the signal light ray to the second measurement light ray and the relative frequency of the second measurement light ray to the signal light ray are positive values. It can be learned that, in this solution, a relative wavelength or a relative frequency of a positive value is set with reference to a real wavelength or frequency situation, so that the weight of the first performance curve and the weight of the second performance curve can be directly set with reference to a ratio of two positive values.

It should be noted that, in a more simplified manner, absolute values of relative frequencies of the signal light ray to the two measurement light rays may alternatively be directly obtained, and weights of the two performance curves are set based on a ratio of the two absolute values. Alternatively, absolute values of relative wavelengths of the signal light ray to the two measurement light rays are directly obtained, and the weights of the two performance curves are set based on a ratio of the two absolute values. In addition, based on the weight setting manner, when the two measurement light rays have a same wavelength difference with the wavelength of the signal light ray, or the two measurement light rays have a same frequency difference with the frequency of the signal light ray, the first performance curve and the second performance curve may correspond to a same weight, for example, both are 0.5.

It should be understood that, in another optional implementation, when the two measurement light rays have a same wavelength difference with the center wavelength of the signal light ray, power transferred out by the short-wavelength measurement light ray is equivalent to power transferred into the long-wavelength measurement light ray. Therefore, after determining the first performance curve based on the first returned light ray corresponding to the first measurement light ray and determining the second performance curve based on the second returned light ray corresponding to the second measurement light ray, the optical time-domain reflectometer 200 may further directly perform a weighted sum of the first performance curve and the second performance curve, to obtain the target performance curve. This calculation manner is relatively simple, is easy to implement, and can effectively improve measurement efficiency.

In this embodiment of this application, the optical time-domain reflectometer may be an optical time-domain reflectometer that is of any structure and that can generate two measurement light rays of different wavelengths. For example, refer to the optical time-domain reflectometer 200 shown in FIG. 2. In an example, the optical time-domain reflectometer 200 may include a first laser 211, a first pulse modulator 221, a second laser 212, a second pulse modulator 222, a combiner 230, a circulator 240, a splitter 250, a first detector 261, a second detector 262, and a processor 270. An output end of the first laser 211 is connected to an input end of the first pulse modulator 221. An output end of the first pulse modulator 221 is connected to a first input end of the combiner 230. An output end of the second laser 212 is connected to an input end of the second pulse modulator 222. An output end of the second pulse modulator 222 is connected to a second input end of the combiner 230. An output end of the combiner 230 is connected to an input end $b_1$ of the circulator 240. A communication end $b_2$ of the circulator 240 is connected to a communication end c of the optical time-domain reflectometer 200. An output end $b_3$ of the circulator 240 is connected to an input end of the splitter 250. A first output end of the splitter 250 is connected to an input end of the first detector 261. A second output end of the splitter 250 is connected to an input end of the second detector 262. An output end of the first detector 261 is connected to a first input end of the processor 270. An output end of the second detector 262 is connected to a second input end of the processor 270.

In an implementation, the first laser 211 may emit a direct current light ray with a wavelength of $\lambda_1$. After entering the first pulse modulator 221, the direct current light ray is modulated into a first measurement light ray in a pulse form with a wavelength of $\lambda_1$ (a pulse width and a transmission period are not limited), and is then sent to the combiner 230. The second laser 212 may emit a direct current light ray with a wavelength of $\lambda_2$. After entering the second pulse modulator 222, the direct current light ray is modulated into a second measurement light ray with a wavelength of $\lambda_2$ in a pulse form (a pulse width and a transmission period are not limited), and is also sent to the combiner 230. After combining the first measurement light ray with the wavelength $\lambda_1$ and the second measurement light ray with the wavelength $\lambda_2$ into a dual-wavelength measurement optical signal, the combiner 230 sends the dual-wavelength measurement optical signal to the input end $b_1$ of the circulator 240. The dual-wavelength measurement optical signal is output to the wavelength division multiplexer 300 through the communication end $b_2$ of the circulator 240. Then, in the wavelength division multiplexer 300, the dual-wavelength measurement optical signal and signal light ray output by the signal generator 100 are combined and then coupled to an optical fiber simultaneously from a same direction. A returned light ray generated when the dual-wavelength measurement optical signal is transmitted in the optical fiber is returned to the communication end $a_3$ of the wavelength division multiplexer 300 along a reverse direction of the input direction. Then, the returned light ray is output to the communication end $b_2$ of the circulator 240 through the communication end $a_2$ of the wavelength division multiplexer 300, and is output to the splitter 250 through the output end $b_3$ of the circulator 240. The splitter 250 splits the returned light ray into a first returned light ray corresponding to the first measurement light ray and a second returned light ray corresponding to the second measurement light ray, and sends the first returned light ray to the first detector 261 and the second returned light ray to the second detector 262. The first detector 261 converts the first returned light ray into a first analog electrical signal and sends the first analog electrical signal to the processor 270. The second detector 262 converts the second returned light ray into a second analog electrical signal and sends the second analog electrical signal to the processor 270. The processor 270 performs sampling on the first analog electrical signal to obtain a discrete first performance curve, performs sampling on the second analog electrical signal to obtain a discrete second performance curve, and then performs a weighted sum of the two performance curves based on the weight corresponding to the first performance curve and the weight corresponding to the second performance curve to obtain the target performance curve.

Figure 4:
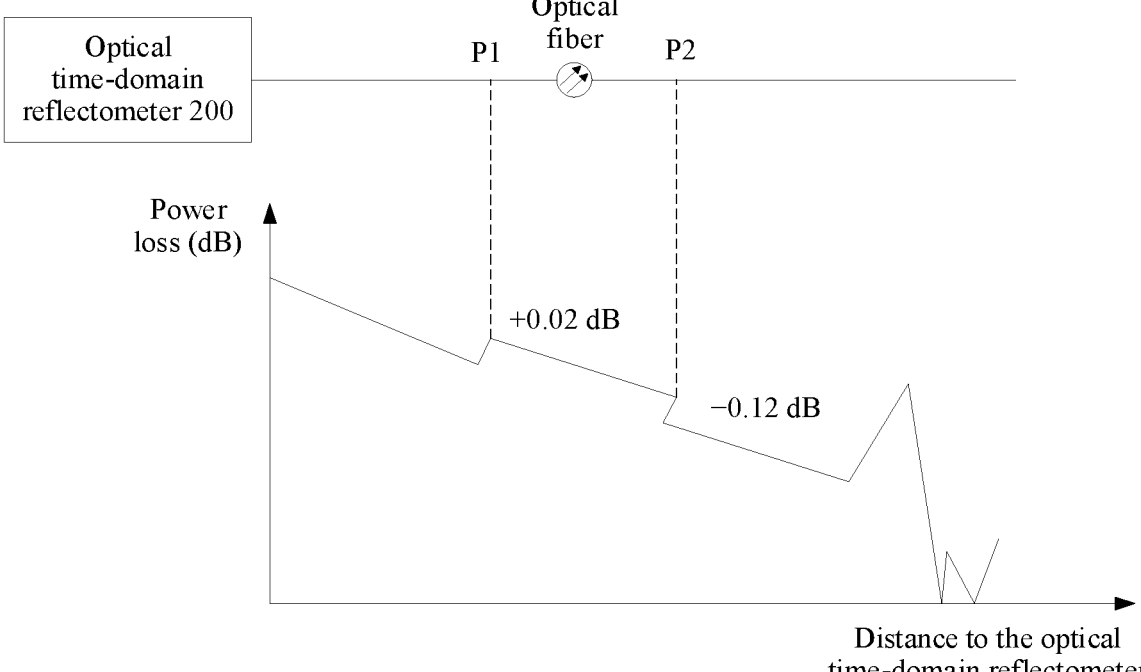
FIG. 4 is an example of a schematic diagram of a unidirectional power attenuation change curve of an optical fiber according to an embodiment of this application.

In this embodiment of this application, the performance curve of the optical fiber may be specifically a power attenuation change curve. FIG. 4 is an example of a schematic diagram of a power attenuation change curve of an optical fiber. As shown in FIG. 4, after the optical time-domain reflectometer 200 emits a measurement light ray from one end of the optical fiber, the measurement light ray is transmitted from one end of the optical fiber to the other end along the optical fiber. When the measurement light ray is transmitted to each position, a returned light ray is generated and returned to the optical time-domain reflectometer 200 due to impact of a material of a medium at each position. Light has a fixed propagation speed. Therefore, power of a reverse reflected light ray collected by the optical time-domain reflectometer 200 at each moment is actually a power loss of the optical fiber at each position. According to this principle, after emitting the two measurement light rays, the optical time-domain reflectometer 200 may receive a returned light ray corresponding to each measurement light ray in a timely manner. A power attenuation change curve is constructed based on returned light rays at different moments corresponding to each measurement light, and a target power change curve shown in FIG. 4 is obtained after a weighted sum of the two power change curves. Based on the target power change curve, a position at which a problem exists in the optical fiber can be obtained. For example, in FIG. 4, power corresponding to a position P1 in the optical fiber is increased by 0.02 dB suddenly. This sudden increase indicates that an optical fiber core area at the position P1 may be changed. In FIG. 4, power corresponding to a position P2 in the optical fiber is decreased by 0.12 dB suddenly. This sudden decrease indicates that lossy splicing may exist at the position P2.

It should be noted that, in the foregoing content, the returned light ray corresponding to the measurement light ray may be a returned light ray having a same wavelength as the measurement light ray (for example, when the returned light ray is caused by Rayleigh scattering, a scattering process does not affect the wavelength of the measurement light ray, that is, the wavelengths of the returned light ray and the measurement light ray are the same). Alternatively, the returned light ray corresponding to the measurement light ray may be a returned light ray whose wavelength has a specific deviation with the wavelength of the measurement light ray (for example, when the returned light ray is caused by Brillouin scattering, a new optical carrier whose wavelength is different from the wavelength of the measurement light ray is stimulated in the scattering process, that is, the wavelengths of the returned light ray and the measurement light ray may be different). Certainly, the returned light ray may further include two or more types of returned light rays whose wavelengths are the same as the wavelength of the measurement light ray and have a specific deviation with the wavelength of the measurement light ray (both Rayleigh scattering and Brillouin scattering are stimulated).

For example, the first laser 211 and the second laser 212 may further have a function of tunable wavelengths. In an implementation, the first laser 211 and the second laser 212 may further be connected to the processor 270. The processor 270 may further control the first laser 211 and the second laser 212 for a plurality of times to emit direct current light rays in a plurality of wavelength combinations, obtain a target performance curve in each wavelength combination by collecting a returned light ray in each wavelength combination, and then determine a final target performance curve by combining a plurality of target performance curves in the plurality of wavelength combinations. For example, an average performance curve of the plurality of target performance curves is used as the final target performance curve. In this way, a final measurement result is obtained by combining measurement results of a plurality of measurements. This not only makes the measurement result more persuasive, but also avoids an accidental error existed when performance is determined by using only one measurement, thereby helping further improve accuracy of the measurement result.

It should be understood that the optical time-domain reflectometer 200 shown in FIG. 2 is merely an example. In an implementation, some variations may further be made to the optical time-domain reflectometer 200 shown in FIG. 2 to obtain a new optical time-domain reflectometer. For example, in another example, a filter may further be disposed between the splitter 250 and the first detector 261 and between the splitter 250 and the second detector 262. First, the filter is used to filter out light rays whose wavelengths are different from the wavelength of the returned light ray corresponding to the measurement light ray and that is transmitted on each link, and then send the returned light ray obtained after filtering to the processor 270. This improves purity of input signals used by the processor 270 to construct a performance curve. For another example, in still another example, a polarization switch may be disposed between the first pulse modulator 221 and the combiner 230, and between the second pulse modulator 222 and the combiner 230. The polarization switch is first used to correct a measurement light ray modulated by each pulse modulator, and then measurement light rays after correction are combined. For yet another example, in yet another example, a pulse generator may further be disposed. One end of the pulse generator is connected to the first pulse modulator 221 and the second pulse modulator 222, and the other end of the pulse generator is connected to the processor 270. The processor 270 may further first instruct the pulse generator to generate a required pulse form, and then send the pulse form to the pulse modulator through the pulse generator, to perform pulse modulation of the measurement light ray. In addition, after computing pulse modulation of the measurement light ray, the first pulse modulator 221 or the second pulse modulator 222 may further notify the processor 270 of a modulation result through the pulse generator, so that the processor 270 and the two pulse modulators can maintain time synchronization. It should be understood that optical time-domain reflectometers of any structure that can generate two measurement light rays of different wavelengths fall within the protection scope of this application, and details are not described herein again in this application.

In the foregoing Embodiment 1, through unidirectional transmission of two measurement light rays whose wavelengths are longer than and shorter than the wavelength of the signal light ray, power of the short-wavelength measurement light ray is transferred to the signal light ray, and power of the signal light ray is transferred to the long-wavelength measurement light ray. The returned light rays of the two measurement light rays are used to comprehensively determine performance of the optical fiber. This helps mutually offset the power transferred by the two measurement light rays in the measurement result, effectively eliminate interference of the stimulated scattering effect to the measurement process, and improve accuracy of the measurement result without affecting normal service transmission of the signal light ray. In addition, in the solution of unidirectional transmission of the two measurement light rays and the signal light ray, the optical time-domain reflectometer can further calculate performance of the optical fiber in a weighted sum manner. The weighted sum calculation manner is simple, is easy to implement, and therefore further helps improve efficiency of optical fiber measurement.

Based on Embodiment 2 to Embodiment 4, the following further describes application of the optical fiber measurement system in Embodiment 1 in different scenarios.

Embodiment 2

Figure 5:
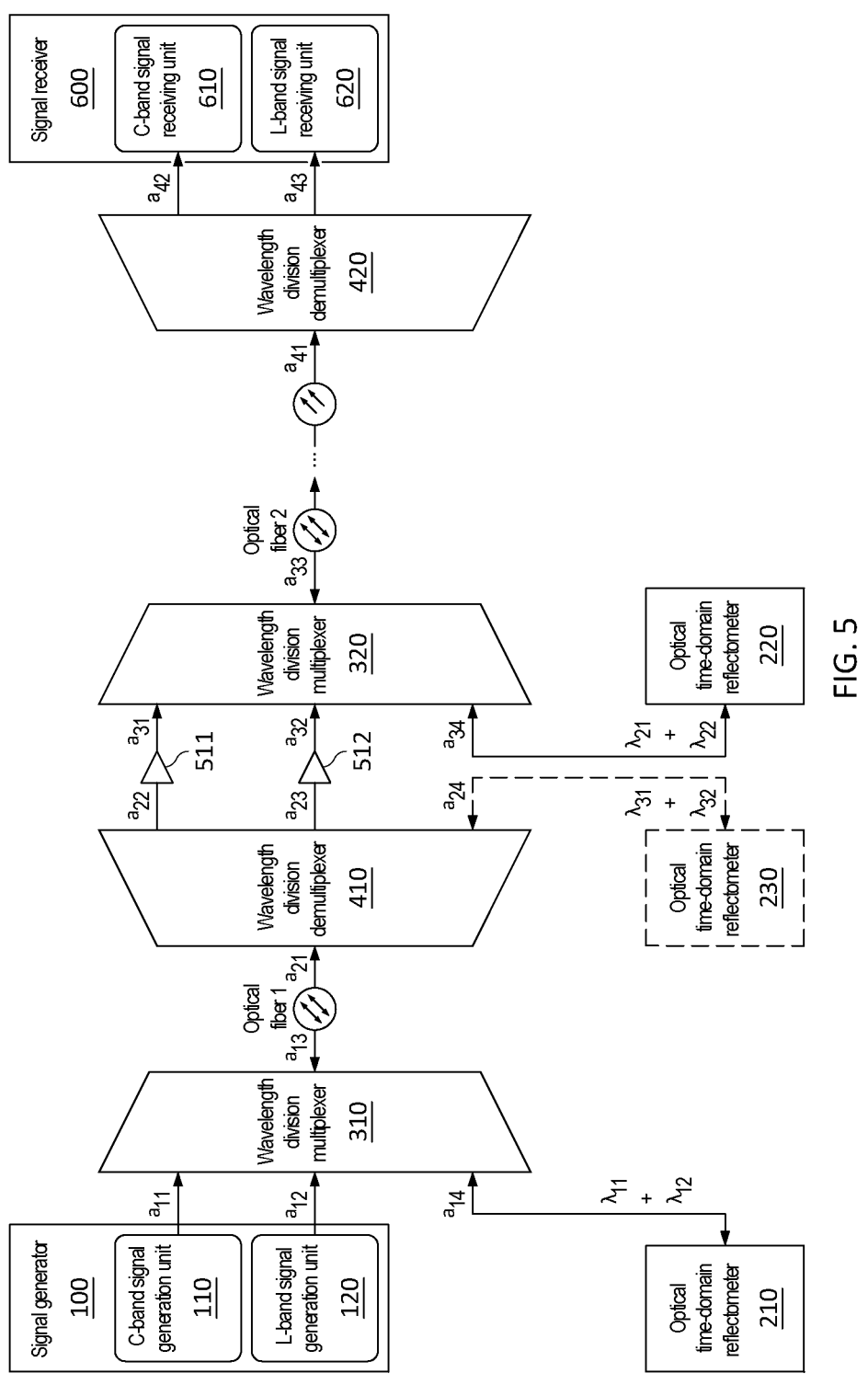
FIG. 5 is an example of a schematic diagram of an architecture of a C+L band wavelength division multiplexing measurement system according to an embodiment of this application.

FIG. 5 is an example of a schematic diagram of an architecture of a C+L band wavelength division multiplexing measurement system according to an embodiment of this application. As shown in FIG. 5, in this example, the C+L band wavelength division multiplexing system may include at least two optical fibers, for example, an optical fiber 1 and an optical fiber 2, and may further include a signal generator 100, a wavelength division multiplexer 310, a wavelength division demultiplexer 410, a C-band amplifier 511, an L-band amplifier 512, a wavelength division multiplexer 320, a wavelength division demultiplexer 420, and a signal receiver 600. In this example, the signal generator 100 may correspondingly be the optical transmitter in FIG. 1, the signal receiver 600 may correspondingly be the optical receiver in FIG. 1, and the C-band amplifier 511 and the L-band amplifier 512 may be disposed at positions of the optical repeaters in FIG. 1. The signal generator 100 may include a C-band signal generation unit 110 and an L-band signal generation unit 120, and the signal receiver 600 may include a C-band signal receiving unit 610 and an L-band signal receiving unit 620. An output end of the C-band signal generation unit 110 is connected to an input end an of the wavelength division multiplexer 310. An output end of the L-band signal generation unit 120 is connected to an input end $a_{12}$ of the wavelength division multiplexer 310. A communication end $a_{13}$ of the wavelength division multiplexer 310 is connected to one end of the optical fiber 1. The other end of the optical fiber 1 is connected to a communication end $a_{21}$ of the wavelength division demultiplexer 410. An output end $a_{22}$ of the wavelength division demultiplexer 410 is connected to an input end of the C-band amplifier 511. An output end $a_{23}$ of the wavelength division demultiplexer 410 is connected to an input end of the L-band amplifier 512. An output end of the C-band amplifier 511 is connected to an input end $a_{31}$ of the wavelength division multiplexer 320. An output end of the L-band amplifier 512 is connected to an input end $a_{32}$ of the wavelength division multiplexer 320. A communication end a 33 of the wavelength division multiplexer 320 is connected to one end of the optical fiber 2. The other end of the optical fiber 2 is connected to an input end a 41 of the wavelength division demultiplexer 420. An output end $a_{42}$ of the wavelength division demultiplexer 420 is connected to an input end of the C-band signal receiving unit 610. An output end $a_{43}$ of the wavelength division demultiplexer 420 is connected to an input end of the L-band signal receiving unit 620.

In the C+L band wavelength division multiplexing system, the C-band signal generation unit 110 may send a C-band signal light ray with a wavelength range of 1530 nm to 1565 nm to the wavelength division multiplexer 310, and the L-band signal generation unit 120 may send an L-band signal light ray with a wavelength range of 1565 nm to 1625 nm to the wavelength division multiplexer 310. The wavelength division multiplexer 310 combines the C-band signal light ray and the L-band signal light ray, and couples a combined signal light ray into the optical fiber 1. Then, the combined signal light ray is transmitted to the wavelength division demultiplexer 410 through the optical fiber 1. The wavelength division demultiplexer 410 decouples the combined signal light ray, obtains the C-band signal light ray in the combined signal light ray and transmits the C-band signal light ray to the C-band amplifier 511 for amplification, and obtains the L-band signal light ray in the combined signal light ray and transmits the L-band signal light ray to the L-band amplifier 512 for amplification. An amplified C-band signal light ray and an amplified L-band signal light ray enter the wavelength division multiplexer 320. The wavelength division multiplexer 320 combines the amplified C-band signal light ray and the amplified L-band signal light ray, and couples a combined signal light ray into the optical fiber 2. Then, the combined signal light ray is transmitted to the wavelength division demultiplexer 420 through the optical fiber 2. The wavelength division demultiplexer 420 decouples the combined signal light ray, obtains the C-band signal light ray in the combined signal light ray and sends the C-band signal light ray to the C-band signal receiving unit 610, and obtains the L-band signal light ray in the combined signal light ray and sends the L-band signal light ray to the L-band signal receiving unit 620.

In this embodiment of this application, any optical fiber or any plurality of optical fibers in the C+L band wavelength division multiplexing system may be measured.

When the optical fiber 1 is measured, the C+L band wavelength division multiplexing system may further include an optical time-domain reflectometer 210. The optical time-domain reflectometer 210 is connected to a communication end $a_{14}$ of the wavelength division multiplexer 310, and is configured to send two types of measurement light rays with wavelengths of $\lambda_{11}$ and $\lambda_{12}$ to the wavelength division multiplexer 310. In this way, the C-band signal light ray emitted by the C-band signal generation unit 110, the L-band signal light ray emitted by the L-band signal generation unit 120, and the measurement light rays of two wavelengths emitted by the optical time-domain reflectometer 210 enter the wavelength division multiplexer 310 simultaneously from a same direction, are combined by the wavelength division multiplexer 310, and then are coupled into the optical fiber 1. A returned light ray generated when a combined optical signal is transmitted in the optical fiber 1 is returned to the optical time-domain reflectometer 210 through the wavelength division multiplexer 310, so that the optical time-domain reflectometer 210 determines performance of the optical fiber 1 based on the calculation manner in the Embodiment 1.

When the optical fiber 2 is measured, the C+L band wavelength division multiplexing system may further include an optical time-domain reflectometer 220. The optical time-domain reflectometer 220 is connected to a communication end $a_{34}$ of the wavelength division multiplexer 320, and is configured to send two types of measurement light rays with wavelengths of $\lambda_{21}$ and $\lambda_{22}$ to the wavelength division multiplexer 320. In this way, the amplified C-band signal light ray emitted by the C-band amplifier 511, the amplified L-band signal light ray emitted by the L-band amplifier 512, and the measurement light rays of two wavelengths emitted by the optical time-domain reflectometer 220 enter the wavelength division multiplexer 320 simultaneously from the same direction, are combined by the wavelength division multiplexer 320, and then are coupled into the optical fiber 2. A returned light ray generated when a combined optical signal is transmitted in the optical fiber 2 is returned to the optical time-domain reflectometer 220 through the wavelength division multiplexer 320, so that the optical time-domain reflectometer 220 determines performance of the optical fiber 2 based on the calculation manner in the Embodiment 1.

When the optical fiber 1 and the optical fiber 2 are measured, the C+L band wavelength division multiplexing system may further include both the optical time-domain reflectometer 210 and the optical time-domain reflectometer 220. The optical time-domain reflectometer 210 is configured to measure the optical fiber 1, and the optical time-domain reflectometer 220 is configured to measure the optical fiber 2. In addition, the wavelength division demultiplexer 410 is disposed at a connection point between the optical fiber 1 and the optical fiber 2. The wavelength division demultiplexer 410 can obtain signal light rays of two bands from signals transmitted from the optical fiber 1, send the signal light rays of two bands to respective amplifiers for amplification, and discard other signals obtained from the signals transmitted from the optical fiber 1. In other words, measurement processes of the two optical time-domain reflectometers do not affect each other. Therefore, the wavelengths $\lambda_{11}$ and $\lambda_{12}$ of the two types of measurement light rays emitted by the optical time-domain reflectometer 210 may be the same as or different from the wavelengths $\lambda_{21}$ and $\lambda_{22}$ of the two types of measurement light rays emitted by the optical time-domain reflectometer 220. This is not specifically limited. In the measurement solution, not only the optical fiber 1 for transmission at a transmitting end but also the optical fiber 2 for transmission at an intermediate segment may be measured. An optical time-domain reflectometer is disposed at one end of each optical fiber to unidirectionally measure performance of each optical fiber in an optical fiber system.

Figures 6A, 6B:
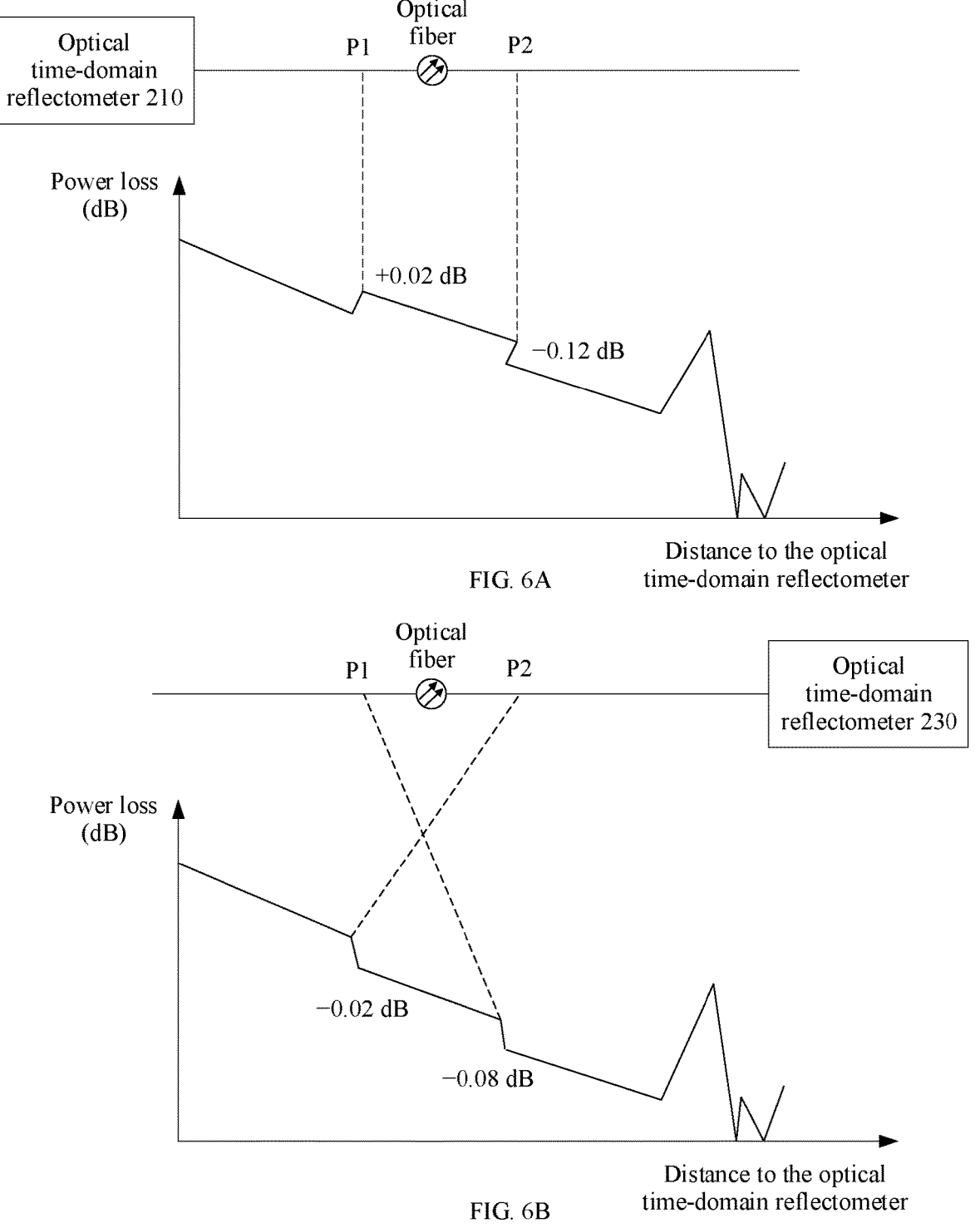
FIGS. 6A and 6B are schematic diagrams of bidirectional power attenuation change curves of optical fibers according to embodiments of this application.

Still refer to FIG. 5. In an optional implementation, measuring the optical fiber 1 is used as an example. The C+L band wavelength division multiplexing system may further include both the optical time-domain reflectometer 210 and the optical time-domain reflectometer 230, and the optical time-domain reflectometer 210 and the optical time-domain reflectometer 230 are respectively located at two ends of the optical fiber 1. For example, the optical time-domain reflectometer 210 is connected to the communication end $a_{14}$ of the wavelength division multiplexer 310 located on a left side of the optical fiber 1 shown in the figure (an upstream end of the optical fiber 1 is shown in the figure, that is, an end that receives a signal light ray), and is configured to send the two types of measurement light rays with the wavelengths of $\lambda_{11}$ and $\lambda_{12}$ to the wavelength division multiplexer 310. The optical time-domain reflectometer 230 is connected to a communication end $a_{24}$ of the wavelength division demultiplexer 410 located on a right side of the optical fiber 1 shown in the figure (a downstream end of the optical fiber 1 is shown in the figure, that is an end that emits a signal light ray), and is configured to send the two types of measurement light rays with the wavelengths of $\lambda_{31}$ and $\lambda_{32}$ to the wavelength division demultiplexer 410. In this way, on one hand, the two types of measurement light rays emitted by the optical time-domain reflectometer 210 can be coupled in a same direction with the signal light ray into an upstream node of the optical fiber 1 through the wavelength division multiplexer 310, so that the optical time-domain reflectometer 210 obtains, based on a returned light ray, a first target performance curve (as shown in FIG. 6A) that is measured at the upstream node of the optical fiber 1. On the other hand, two types of measurement light rays emitted by the optical time-domain reflectometer 230 may be directly coupled into the optical fiber 1 from a downstream node of the optical fiber 1 through the wavelength division demultiplexer 410, so that the optical time-domain reflectometer 230 obtains, based on a returned light ray, a second target performance curve (as shown in (B) in FIG. 6) measured at the downstream node of the optical fiber 1.

Generally, when a measurement light ray is transmitted in an optical fiber, power of the measurement light ray decreases with an increase of a transmission distance. Therefore, measurement precision in a single measurement direction decreases with the increase of the measurement distance. A position with a longer distance to the optical time-domain reflectometer indicates lower power of the measurement light ray. In addition, a power loss in only one direction can be obtained in unidirectional measurement. A specific damage cause cannot be identified at an optical fiber extrusion point, a lossy connector, or a point for splicing optical fibers with different core diameters. A description of an "event" in the optical fiber is not accurate, especially at an end far away from the optical time-domain reflectometer. As a result, a capability for distinguishing "events" is further reduced. Therefore, in the foregoing implementation, an optical time-domain reflectometer is disposed at each end of an optical fiber, so that the optical fiber can be measured bidirectionally by using two optical time-domain reflectometers, and loss information in two directions can be obtained at each position of the optical fiber. This helps more accurately quantize the loss, accurately locate a problem existed in the optical fiber (including but not limited to a specific damage cause at an optical fiber extrusion point, a lossy connector, or a point for splicing optical fibers with different core diameters), and improve accuracy and refinement of optical fiber measurement. In addition, by using bidirectional measurement, a test blind area existed in unidirectional measurement is covered, and an effective measurement range is effectively expanded. For example, refer to FIGS. 6A and 6B. A power loss of +0.02 dB is increased suddenly when a position P1 in the optical fiber is measured in a direction from left to right shown in the figure, and a power loss of −0.08 dB is decreased suddenly when the position P1 is measured in a direction from right to left shown in the figure. According to the positive and negative power losses, it may be accurately located that a problem of optical fiber extrusion exists at the position P1. Correspondingly, a power loss of −0.12 dB is decreased suddenly when a position P2 in the optical fiber is measured in a direction from left to right shown in the figure, and a power loss of −0.02 dB is decreased suddenly when the position P2 is measured in a direction from right to left shown in the figure. According to the two negative power losses, it may be accurately located that a problem of optical fiber splicing may exist at the position P2.

For example, in the foregoing implementation, the wavelengths $\lambda_{11}$ and $\lambda_{12}$ of the two types of measurement light rays emitted by the optical time-domain reflectometer 210 are different from wavelengths $\lambda_{31}$ and $\lambda_{32}$ of the two types of measurement light rays emitted by the optical time-domain reflectometer 230. In this way, even if measurement light rays emitted by one optical time-domain reflectometer enter the optical time-domain reflectometer on the opposite side, the measurement light rays are filtered out by the optical time-domain reflectometer on the opposite side, instead of being used by the optical time-domain reflectometer on the opposite side to analyze performance of the optical fiber because wavelengths of the measurement light rays are different from those of measurement light rays emitted by the optical time-domain reflectometer on the opposite side. This helps improve accuracy of optical fiber measurement in each direction.

It should be understood that the Embodiment 2 is described only by using the C+L band wavelength division multiplexing system as an example. When the optical fiber system transmits only single-band signal light rays, the C-band amplifier 511 and the L-band amplifier 512 shown in FIG. 3 may also be replaced by one optical fiber amplifier. Alternatively, when the optical fiber system transmits signal light rays of three or more bands simultaneously, the C-band amplifier 511 and the L-band amplifier 512 shown in FIG. 3 may further be replaced by three or more amplifiers. Details are not described again in this application.

Embodiment 3

Figure 7:
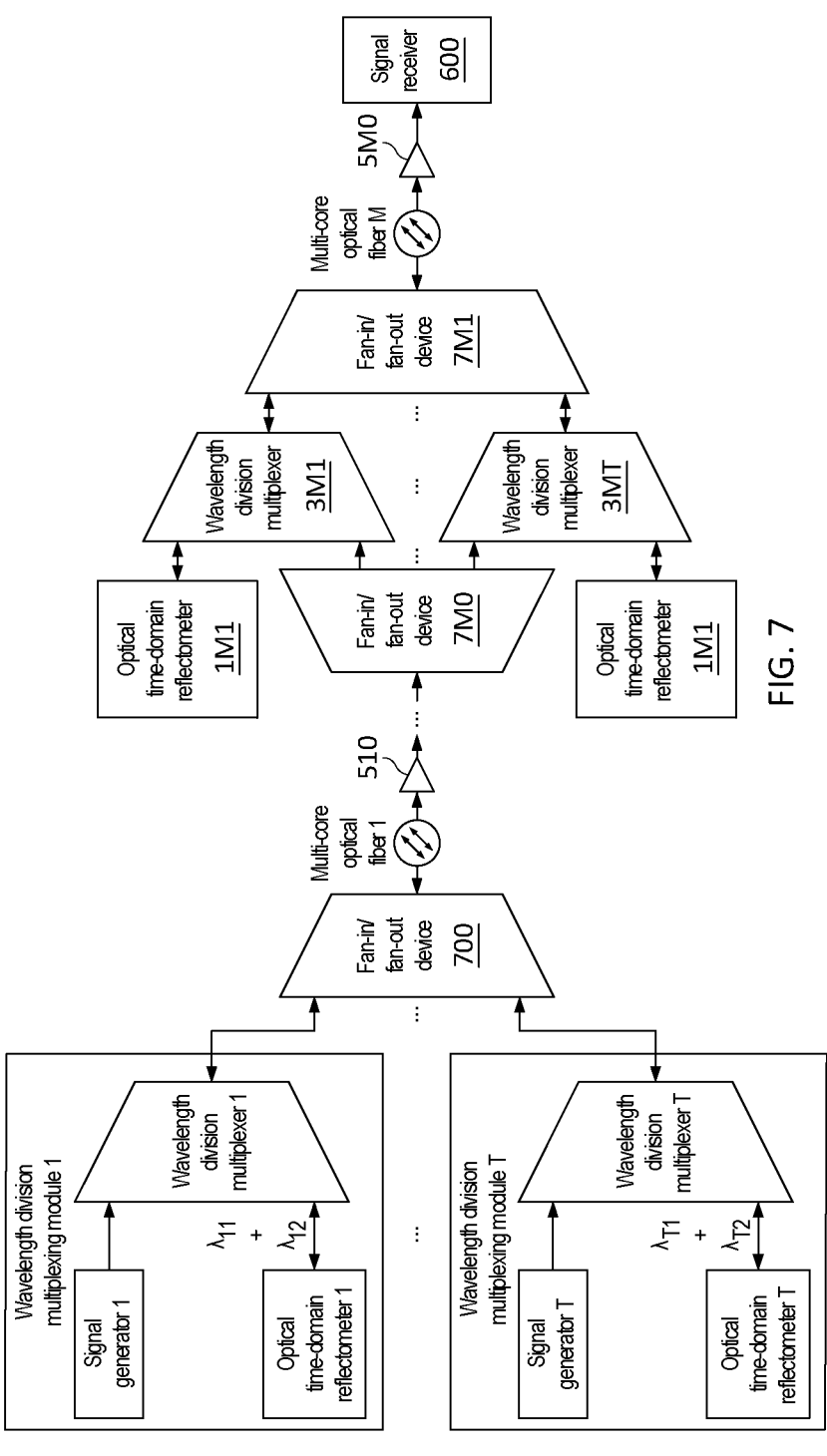
FIG. 7 is an example of a schematic diagram of an architecture of a core division multiplexing measurement system according to an embodiment of this application.

FIG. 7 is an example of a schematic diagram of an architecture of a core division multiplexing measurement system according to an embodiment of this application. An optical fiber in the core division multiplexing system may be specifically a multi-core optical fiber, that is, an optical fiber that includes a plurality of fiber cores. As shown in FIG. 7, in this example, the core division multiplexing system may include M multi-core optical fibers (that is, a multi-core optical fiber 1, a multi-core optical fiber 2, . . . , and a multi-core optical fiber M, where M is a positive integer). If each of the M multi-core optical fibers includes T fiber cores, the core division multiplexing system may further include T wavelength division multiplexing modules (that is, a wavelength division multiplexing module 1, a wavelength division multiplexing module 2, . . . , and a wavelength division multiplexing module T, where T is a positive integer greater than or equal to 2) that are in a one-to-one correspondence with the T fiber cores of the multi-core optical fiber 1, a fan-in/fan-out device 700, an optical fiber amplifier 510, . . . , an optical fiber amplifier 5M0, and a signal receiver 600. Each of the T wavelength division multiplexing modules may include a signal generator, an optical time-domain reflectometer, and a wavelength division multiplexer. In each wavelength division multiplexing module, the signal generator sends a signal light ray to the wavelength division multiplexer, the optical time-domain reflectometer sends two types of measurement light rays whose wavelengths are respectively longer than and shorter than a wavelength of the signal light ray to the wavelength division multiplexer, and the wavelength division multiplexer combines the two types of measurement light rays and the signal light ray and then sends a combined light ray out. The fan-in/fan-out device 700 may include T first ends and one second end. The T wavelength division multiplexing modules are respectively connected to the T first ends of the fan-in/fan-out device 700. The second end of the fan-in/fan-out device 700 is connected to one end of the multi-core optical fiber 1, and the other end of the multi-core optical fiber 1 is connected to the optical fiber amplifier 510. Implementation processes of the optical fiber amplifier 510, . . . , the optical fiber amplifier 5M0, and the signal receiver 600 in this solution are the same as those in the Embodiment 2. The only difference lies in that the two amplifiers in the Embodiment 2 are combined into one amplifier in this embodiment. It should be understood that if signals in a plurality of bands are also transmitted in the multi-core optical fiber 1 in the Embodiment 3, the optical fiber amplifier 510 may also include amplifiers corresponding to the plurality of bands as described in the Embodiment 2. In addition, a wavelength division demultiplexer may further be disposed between the multi-core optical fiber 1 and the plurality of amplifiers. Details are not described again in this application.

In this embodiment of this application, one multi-core optical fiber or a plurality of multi-core optical fibers in the core division multiplexing system may be measured.

When the multi-core optical fiber 1 is measured, the T wavelength division multiplexing modules may separately send optical signals obtained after combination (referred to as composite optical signals below) to the T first ends of the fan-in/fan-out device 700. The fan-in/fan-out device 700 separately couples the T composite optical signals to the T fiber cores of the multi-core optical fiber 1, so that the T composite optical signals are transmitted in the same optical fiber by using core division multiplexing. Then, when each composite optical signal is transmitted in the corresponding fiber core, a generated backward returned light ray is returned to the second end of the fan-in/fan-out device 700 in a reverse direction of the transmission direction. The fan-in/fan-out device 700 transmits the backward returned light ray to the wavelength division multiplexer in the wavelength division multiplexing module corresponding to the fiber core through the first end corresponding to the composite optical signal. Then, the backward returned light ray is received by the optical time-domain reflectometer corresponding to the wavelength division multiplexer. After receiving the returned light ray of the fiber core corresponding to the wavelength division multiplexing module, each optical time-domain reflectometer may determine performance of the fiber core based on the returned light ray. An optical time-domain reflectometer corresponding to each fiber core is disposed to measure performance of each fiber core in a multi-core optical fiber.

In this embodiment of this application, the optical fiber amplifier 510 may be set to correspond to bands of T signal light rays emitted by T signal generators 1-T, and signals output by the multi-core optical fiber 1 are transmitted to the optical fiber amplifier 510 (or after signal light rays of different bands are split by using the wavelength division demultiplexer in the Embodiment 2, the signal light rays of different bands are sent to amplifiers corresponding to the bands). The optical fiber amplifier 510 amplifies power of signal light rays in the signals, and then the signal light rays enter a next multi-core optical fiber. Measurement light rays in the signals are not further transmitted. Therefore, an optical fiber amplifier is disposed to amplify power of weak signal light rays transmitted from a previous optical fiber, which can compensate for an optical power loss caused by transmission through a plurality of multi-core optical fibers, and implement long-distance signal transmission. In addition, measurement light rays of the previous optical fiber do not enter a next optical fiber, so that the measurement light rays of the previous optical fiber do not interfere with a measurement process of the next optical fiber. This helps improve accuracy for measuring the next optical fiber.

When another multi-core optical fiber (for example, the multi-core optical fiber M) other than the multi-core optical fiber 1 is measured, the core division multiplexing system may further include a fan-in/fan-out device 7M0, T wavelength division multiplexers 3M1-3MT that are in a one-to-one correspondence with T fiber cores of the multi-core optical fiber M, T optical time-domain reflectometers 1M1-1MT that are in a one-to-one correspondence with the T wavelength division multiplexers 3M1-3MT, and a fan-in/fan-out device 7M1. The fan-in/fan-out device 7M0 may include one input end and T output ends, and the fan-in/fan-out device 7M1 may include T first ends and one second end. The input end of the fan-in/fan-out device 7M0 is connected to the previous optical fiber, and the T output ends of the fan-in/fan-out device 7M0 are respectively connected to input ends of the T wavelength division multiplexers 3M1-3MT. The T optical time-domain reflectometers 1M1-1MT are respectively connected to first communication ends of the T wavelength division multiplexers 3M1-3MT. Second communication ends of the T wavelength division multiplexers 3M1-3MT are respectively connected to the T first ends of the fan-in/fan-out device 7M1. The second end of the fan-in/fan-out device 7M1 is connected to one end of the multi-core optical fiber M, and the other end of the multi-core optical fiber M is connected to an input end of the optical fiber amplifier 5M0. An output end of the optical fiber amplifier 5M0 is connected to the signal receiver 600. When the multi-core optical fiber M is measured, the fan-in/fan-out device 7M0 may separately send T optical signals transmitted by T fiber cores of the previous optical fiber to the T wavelength division multiplexers 3M1-3MT, and the T optical time-domain reflectometers 1M1-1MT may separately send two types of measurement light rays with different wavelengths to the corresponding wavelength division multiplexers 3M1-3MT. After the two types of measurement light rays emitted by each optical time-domain reflectometer are combined with a signal light ray transmitted by the corresponding fiber core of the previous optical fiber into a composite optical signal through the corresponding wavelength division multiplexer, the composite optical signal is sent to the fan-in/fan-out device 7M1. The fan-in/fan-out device 7M1 separately couples received T composite optical signals into the T fiber cores of the multi-core optical fiber M, so that the T composite optical signals are transmitted in the multi-core optical fiber M by using core division multiplexing. Then, when each composite optical signal is transmitted in the corresponding fiber core, a generated backward returned light ray is returned to the second end of the fan-in/fan-out device 7M1 in a reverse direction of the transmission direction. The fan-in/fan-out device 7M1 transmits the backward returned light ray to the wavelength division multiplexer corresponding to the fiber core. The wavelength division multiplexer forwards the backward returned light ray to the corresponding optical time-domain reflectometer. After receiving the returned light ray of the corresponding fiber core of the multi-core optical fiber M, each of the optical time-domain reflectometers 1M1-1MT may determine performance of the corresponding fiber core of the multi-core optical fiber M based on the returned light ray. T optical time-domain reflectometers are disposed on a left side of the multi-core optical fiber M shown in the figure, so that performance of each fiber core of the multi-core optical fiber M that is measured in a direction from left to right shown in the figure can be obtained.

It can be learned from the foregoing content that the optical fiber measurement system shown in FIG. 7 may unidirectionally measure one or more fiber cores. In addition, the foregoing content is described by using an example in which the T fiber cores are measured simultaneously. In an actual operation, a plurality of optical time-domain reflectometers corresponding to a plurality of fiber cores may simultaneously send measurement light rays to implement synchronous measurement on the plurality of fiber cores, thereby improving measurement efficiency. Alternatively, only one optical time-domain reflectometer sends a measurement light ray each time to measure one fiber core, to reduce interference of different measurements. Certainly, a plurality of measurements may be performed. In each measurement, some optical time-domain reflectometers send measurement light rays to measure a part of the fiber cores. This is not specifically limited. In addition, the multi-core optical fiber M is used as an example. When the multi-core optical fiber M and one or more multi-core optical fibers located before the multi-core optical fiber M are simultaneously measured, to further prevent measurement light rays used by the one or more multi-core optical fibers located before the multi-core optical fiber M from interfering a measurement process of the multi-core optical fiber M, in a possible implementation, the wavelength division demultiplexer may further be disposed between each output end of the fan-in/fan-out device 7M0 and the corresponding wavelength division multiplexer. After a signal light ray and a non-signal light ray (for example, a measurement light ray) in a composite optical signal transmitted from a previous multi-core optical fiber are split by using the wavelength division demultiplexer, the split signal light ray is sent to the corresponding wavelength division multiplexer, and the split non-signal light ray is discarded or sent to another additionally disposed receiving device. In this implementation, it can be ensured that only the signal light ray transmitted from the previous multi-core optical fiber enters the wavelength division multiplexer, and then the signal light ray is coupled to the multi-core optical fiber M together with a measurement light ray for measuring the multi-core optical fiber M. In this way, even if the multi-core optical fiber M and another multi-core optical fiber located before the multi-core optical fiber M use measurement light rays of a same wavelength, the measurement process of the multi-core optical fiber M is not interfered. This effectively improves measurement accuracy of the multi-core optical fiber M.

Figure 8:
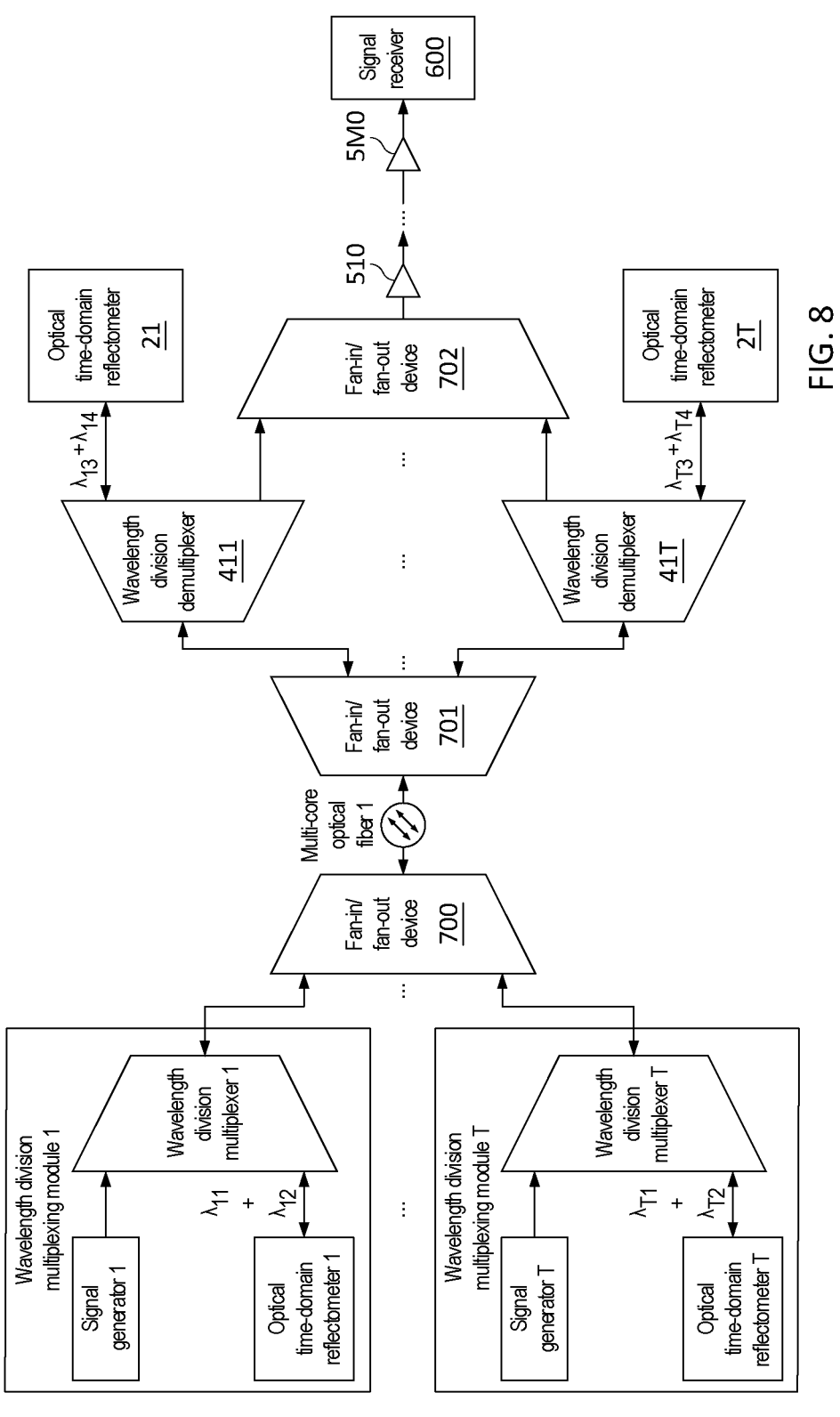
FIG. 8 is an example of a schematic diagram of an architecture of another core division multiplexing measurement system according to an embodiment of this application.

In the optical fiber measurement solution in this application, bidirectional measurement may further be implemented on one or more fiber cores. For example, measuring the multi-core optical fiber 1 is used as an example. FIG. 8 is an example of a schematic diagram of another core division multiplexing measurement system according to an embodiment of this application. As shown in FIG. 8, if bidirectional measurement needs to be performed on one or more fiber cores of the multi-core optical fiber 1, a fan-in/fan-out device 701, T wavelength division demultiplexers 411-41T that are in a one-to-one correspondence with T fiber cores of the multi-core optical fiber 1, T optical time-domain reflectometers 21-2T that are in a one-to-one correspondence with the T wavelength division demultiplexers 411-41T, and a fan-in/fan-out device 702 may further be disposed. The fan-in/fan-out device 701 includes one first end and T second ends, and the fan-in/fan-out device 702 includes T input ends and one output end. The first end of the fan-in/fan-out device 701 is configured to connect to the other end of the multi-core optical fiber 1, and the T second ends of the fan-in/fan-out device 701 are respectively connected to first communication ends of the T wavelength division demultiplexers 411-41T. The T optical time-domain reflectometers 21-2T are respectively connected to second communication ends of the T wavelength division demultiplexers 411-41T. Output ends of the T wavelength division demultiplexers 411-41T are respectively connected to the T input ends of the fan-in/fan-out device 702, and the output end of the fan-in/fan-out device 702 is connected to an optical fiber amplifier 510.

Refer to the architecture of the system shown in FIG. 8. When bidirectional measurement needs to be performed on the T fiber cores of the multi-core optical fiber 1 simultaneously, in addition to that T optical time-domain reflectometers 1—T in T wavelength division multiplexing modules separately emit two types of measurement light rays with different wavelengths in a forward direction, the T optical time-domain reflectometers 21-2T may further separately emit two types of measurement light rays with different wavelengths in a reverse direction. In this way, the measurement light rays emitted by the T optical time-domain reflectometers 1-T in the forward direction are respectively coupled to the T fiber cores of the multi-core optical fiber 1 in the forward direction through the fan-in/fan-out device 700, so that a first target performance curve of the T fiber cores of the multi-core optical fiber 1 may be obtained by using measurement in a direction from left to right shown in the figure based on the foregoing content. In addition, signals of the T fiber cores transmitted to the fan-in/fan-out device 701 through the multi-core optical fiber 1 are respectively coupled to the corresponding wavelength division demultiplexers 411-41T through the fan-in/fan-out device 701. Then, signal light rays in the signals are forwarded to the fan-in/fan-out device 702 through the corresponding wavelength division demultiplexers. The fan-in/fan-out device 702 separately couples the signal light rays in the signals to T fiber cores of a next optical fiber. Correspondingly, the measurement light rays emitted by the T optical time-domain reflectometers 21-2T in the reverse direction are coupled to the T second ends of the fan-in/fan-out device 701 through the corresponding wavelength division demultiplexers 411-41T. Then, the measurement light rays are respectively coupled to the T fiber cores of the multi-core optical fiber 1 in the reverse direction through the fan-in/fan-out device 701 and transmitted in the multi-core optical fiber 1 in a direction from right to left shown in the figure. Then, after returned light rays of the T fiber cores of the multi-core optical fiber 1 are returned to the fan-in/fan-out device 701, the fan-in/fan-out device 701 separately couples the returned light rays to the corresponding T wavelength division demultiplexers 411-41T. Then, the returned light rays are forwarded to the corresponding T optical time-domain reflectometers 21-2T. Each optical time-domain reflectometer, based on the returned light ray of the corresponding fiber core, determines a second target performance curve of the T fiber cores of the multi-core optical fiber 1 obtained through measurement in a direction from right to left shown in the figure. In this way, two optical time-domain reflectometers corresponding to each fiber core are respectively disposed at two ends of the multi-core optical fiber 1, to implement bidirectional measurement on each fiber core of the multi-core optical fiber 1 and provide loss information in two directions at a same position of each fiber core of the multi-core optical fiber 1. This helps more accurately quantize a loss of each fiber core, expand an effective measurement range of each fiber core, and effectively improve accuracy of measuring each fiber core in the core division multiplexing system.

It should be noted that the foregoing content is described only by using an example in which bidirectional measurement is performed on the T fiber cores of the multi-core optical fiber 1 simultaneously. In another example, if only one fiber core of the multi-core optical fiber 1 needs to be measured, only the optical time-domain reflectometer disposed in a forward direction in the wavelength division multiplexing module corresponding to the fiber core may send a measurement light ray in the forward direction, and the optical time-domain reflectometer disposed in a reverse direction corresponding to the fiber core may send a measurement light ray in the reverse direction. Optical time-domain reflectometers in wavelength division multiplexing modules corresponding to other fiber cores and optical time-domain reflectometers disposed in the reverse direction corresponding to the optical cores may not send measurement light rays. In addition, when bidirectional measurement is performed on each fiber core of the multi-core optical fiber 1, wavelengths of measurement light rays emitted by two optical time-domain reflectometers located at two ends of the fiber core are different. For example, assume that the optical time-domain reflectometer 1 emits two measurement light rays with wavelengths $\lambda_{11}$ and $\lambda_{12}$ to measure a fiber core of the multi-core optical fiber 1 in a forward direction, and the optical time-domain reflectometer 21 emits two measurement light rays with wavelengths $\lambda_{13}$ and $\lambda_{14}$ to measure the fiber core of the multi-core optical fiber 1 in a reverse direction, and the wavelengths $\lambda_{11}$, $\lambda_{12}$, $\lambda_{13}$, and $\lambda_{14}$ are different. In this way, even if the two measurement light rays with the wavelengths $\lambda_{11}$ and $\lambda_{12}$ emitted by the optical time-domain reflectometer 1 enter the optical time-domain reflectometer 21 on the opposite side, the two measurement light rays with the wavelengths $\lambda_{11}$ and $\lambda_{12}$ are not used by the optical time-domain reflectometer 21 to analyze performance of the fiber core of the multi-core optical fiber 1 in the reverse direction because the wavelengths $\lambda_{11}$ and $\lambda_{12}$ are different from the wavelengths $\lambda_{13}$ and $\lambda_{14}$ of the two measurement light rays emitted by the optical time-domain reflectometer 21, and vice versa. It can be learned that this wavelength setting manner helps improve accuracy of measuring a fiber core of the multi-core optical fiber 1 in each direction. In addition, a manner of bidirectional measurement of each intermediate multi-core optical fiber from the multi-core optical fiber 2 to the multi-core optical fiber M may be implemented with reference to the foregoing manner of bidirectional measurement of the multi-core optical fiber 1. For example, if bidirectional measurement on T fiber cores of an intermediate multi-core optical fiber needs to be implemented, T optical time-domain reflectometers in a forward direction and T optical time-domain reflectometers in a reverse direction may be respectively disposed at two ends of the intermediate multi-core optical fiber that needs to be measured with reference to a manner of disposing the T optical time-domain reflectometers 1-T in the forward direction and the T optical time-domain reflectometers 21-2T in the reverse direction in FIG. 8. For specific implementation of this part of content, refer to descriptions of the multi-core optical fiber 1 in the foregoing embodiment. Details are not described herein again.

Embodiment 4

Figure 9:
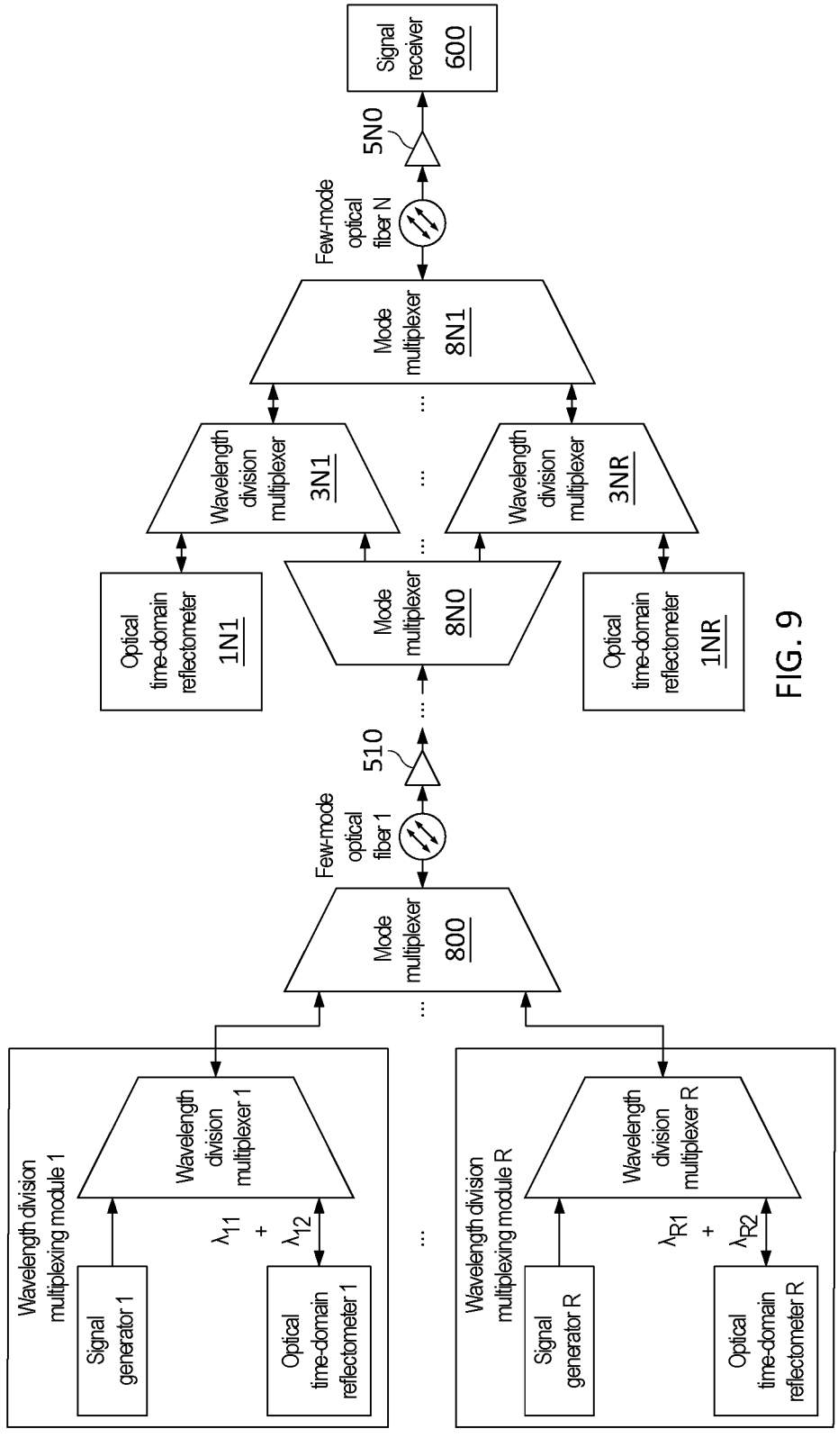
FIG. 9 is an example of a schematic diagram of an architecture of a mode division multiplexing measurement system according to an embodiment of this application.

FIG. 9 is an example of a schematic diagram of an architecture of a mode division multiplexing measurement system according to an embodiment of this application. An optical fiber in the mode division multiplexing system may be specifically a few-mode optical fiber, that is, an optical fiber that transmits optical signals of different modes simultaneously. As shown in FIG. 9, in this example, the mode division multiplexing system may include N few-mode optical fibers (that is, a few-mode optical fiber 1, a few-mode optical fiber 2, . . . , and a few-mode optical fiber N, where N is a positive integer), and may further include R wavelength division multiplexing modules (that is, a wavelength division multiplexing module 1, a wavelength division multiplexing module 2, . . . , and a wavelength division multiplexing module R, where R is a positive integer greater than or equal to 2), a mode multiplexer 800, an optical fiber amplifier 510, . . . , an optical fiber amplifier 5N0, and a signal receiver 600. For a structure of each of the R wavelength division multiplexing modules, refer to the Embodiment 3. Details are not described herein again. The mode multiplexer 800 may include R first ends and one second end. The R wavelength division multiplexing modules are respectively connected to the R first ends of the mode multiplexer 800. The second end of the mode multiplexer 800 is connected to one end of the few-mode optical fiber 1, and the other end of the few-mode optical fiber 1 is connected to the optical fiber amplifier 510. Connection relationships between the optical fiber amplifier 510 or the optical fiber amplifier 5N0 and the signal receiver 600 and implementation processes of the optical fiber amplifier 510, the optical fiber amplifier 5N0, and the signal receiver 600 in this solution are consistent with those in the Embodiment 3. Details are not described again in this application.

In this embodiment of this application, one few-mode optical fiber or a plurality of few-mode optical fibers in the mode division multiplexing system may be measured.

When the few-mode optical fiber 1 is measured, the R wavelength division multiplexing modules may separately send composite optical signals of fundamental modes obtained through combination to the mode multiplexer 800. The mode multiplexer 800 generates a mode for the composite optical signal of each fundamental mode and couples composite optical signals of R modes into the few-mode optical fiber 1, so that composite optical signals of different modes are transmitted in the few-mode optical fiber 1 by using mode division multiplexing. Then, when the composite optical signals of R modes are transmitted in the few-mode optical fiber 1, generated backward returned light rays are returned to the mode multiplexer 800 in a reverse direction of the transmission direction. The mode multiplexer 800 performs mode decomposition for the returned light rays of R modes to obtain returned light rays of R fundamental modes. The returned light rays of R fundamental modes are respectively transmitted to the corresponding wavelength division multiplexers and then are forwarded to the corresponding optical time-domain reflectometers. Each optical time-domain reflectometer may determine, based on a received returned light ray, a performance loss of the few-mode optical fiber 1 when the few-mode optical fiber 1 transmits a light ray of a mode converted from a composite optical signal of a fundamental mode transmitted by the wavelength division multiplexing module. In this solution, performance corresponding to each mode can be obtained through measurement in a direction from left to right shown in the figure, to implement unidirectional measurement of each mode of the few-mode optical fiber 1.

In this embodiment of this application, the optical fiber amplifier 510 may be set to correspond to bands of R signal light rays emitted by R signal generators 1-R. Optical signals of different modes output by the few-mode optical fiber 1 are transmitted to the optical fiber amplifier 510 (or split into signal light rays of different bands by the wavelength division demultiplexer in the Embodiment 2 and then respectively sent to amplifiers corresponding to the bands). Then, the optical fiber amplifier 510 amplifies power of signal light rays in the optical signals, and the signal light rays enter a next few-mode optical fiber. Measurement light rays in the optical signals are not further transmitted. In this way, an optical fiber amplifier is disposed to amplify power of weak signal light rays transmitted from a previous few-mode optical fiber, which can compensate for an optical power loss caused by transmission through a plurality of few-mode optical fibers and implement long-distance signal transmission. In addition, measurement light rays of the previous few-mode optical fiber do not enter the next few-mode optical fiber, so that the measurement light rays of the previous few-mode optical fiber do not interfere with a measurement process of the next few-mode optical fiber. This helps improve accuracy for measuring the next few-mode optical fiber.

When another few-mode optical fiber (for example, the few-mode optical fiber N) other than the few-mode optical fiber 1 is measured, the mode division multiplexing system may further include a mode multiplexer 8N0, R wavelength division multiplexers 3N1-3NR that are in a one-to-one correspondence with R modes of the few-mode optical fiber N, R optical time-domain reflectometers 1N1-1NR that are in a one-to-one correspondence with the R wavelength division multiplexers 3N1-3NR, and a mode multiplexer 8N1. The mode multiplexer 8N0 may include one input end and R output ends, and the mode multiplexer 8N1 may include R first ends and one second end. The input end of the mode multiplexer 8N0 is connected to a previous few-mode optical fiber, and the R output ends of the mode multiplexer 8N0 are respectively connected to input ends of the R wavelength division multiplexers 3N1-3NR. The R optical time-domain reflectometers 1N1-1NR are respectively connected to first communication ends of the R wavelength division multiplexers 3N1-3NR. Second communication ends of the R wavelength division multiplexers 3N1-3NR are respectively connected to the R first ends of the mode multiplexer 8N1. The second end of the mode multiplexer 8N1 is connected to one end of the few-mode optical fiber N, and the other end of the few-mode optical fiber N is connected to an input end of the optical fiber amplifier 5N0. An output end of the optical fiber amplifier 5N0 is connected to the signal receiver 600. When the few-mode optical fiber N is measured, the mode multiplexer 8N0 may perform mode decomposition on optical signals of R modes transmitted from the previous few-mode optical fiber, to obtain optical signals of R fundamental modes, and separately send the optical signals of R fundamental modes to the wavelength division multiplexers 3N1-3NR. The R optical time-domain reflectometers 1N1-1NR may respectively send two types of measurement light rays of different wavelengths to the corresponding R wavelength division multiplexers 3N1-3NR. The two types of measurement light rays emitted by each optical time-domain reflectometer are combined with a signal light ray of the corresponding fundamental mode that is transmitted from the previous optical fiber into a composite optical signal through the corresponding wavelength division multiplexer. Then, the composite optical signal is sent to the mode multiplexer 8N1. The mode multiplexer 8N1 generates composite optical signals of R modes corresponding to the composite optical signals of R fundamental modes, and then couples the composite optical signals of R modes into the few-mode optical fiber N, so that the composite optical signals of R modes are transmitted in the few-mode optical fiber N by using mode division multiplexing. Then, when the composite optical signal of each mode is transmitted in the few-mode optical fiber N, a generated backward returned light ray is returned to the second end of the mode multiplexer 8N1 in a reverse direction of the transmission direction. The mode multiplexer 8N1 performs mode decomposition on returned light rays of R modes to obtain returned light rays of R fundamental modes and separately sends the returned light rays of R fundamental modes to the corresponding R wavelength division multiplexers 3N1-3NR. The R wavelength division multiplexers 3N1-3NR transmit the returned light rays of R fundamental modes to the optical time-domain reflectometers corresponding to the modes. After receiving the returned light ray of the corresponding fundamental mode of the few-mode optical fiber N, each of the optical time-domain reflectometers 1N1-1NR determines performance of the corresponding mode of the few-mode optical fiber N based on the returned light ray. R optical time-domain reflectometers are disposed on a left side of the few-mode optical fiber N shown in the figure, so that performance of each mode of the few-mode optical fiber N measured in a direction from left to right can be obtained.

It can be learned from the foregoing content that the optical fiber measurement system shown in FIG. 9 may implement unidirectional measurement on one or more modes. In addition, the foregoing content is described by using an example in which R modes are measured simultaneously. In an actual operation, a plurality of optical time-domain reflectometers corresponding to a plurality of modes may simultaneously send measurement light rays to implement synchronous measurement on the plurality of modes, thereby improving measurement efficiency. Alternatively, only one optical time-domain reflectometer sends a measurement light ray each time to measure one mode, to reduce interference of different measurements. Certainly, a plurality of measurements may be performed. In addition, in each measurement, some optical time-domain reflectometers send measurement light rays to measure a part of the modes. This is not specifically limited. In addition, the few-mode optical fiber N is used as an example. When the few-mode optical fiber N and one or more few-mode optical fibers located before the few-mode optical fiber N are simultaneously measured, to further prevent measurement light rays used by the one or more few-mode optical fibers located before the few-mode optical fiber N from interfering a measurement process of the few-mode optical fiber N, in a possible implementation, a wavelength division demultiplexer may further be disposed between each output end of the mode multiplexer 8M0 and the corresponding wavelength division multiplexer. After a signal light ray and a non-signal light ray (for example, a measurement light ray)

in a composite optical signal transmitted from the previous few-mode optical fiber are split by using the wavelength division demultiplexer, the split signal light ray is sent to the corresponding wavelength division multiplexer, and the split non-signal light ray is discarded or sent to another additionally disposed receiving device. In this implementation, it can be ensured that only the signal light ray transmitted from the previous few-mode optical fiber enters the wavelength division multiplexer. The signal light ray and a measurement light ray for measuring the few-mode optical fiber N are coupled to the few-mode optical fiber N after mode conversion. In this way, even if the few-mode optical fiber N and another few-mode optical fiber located before the few-mode optical fiber N use measurement light rays of a same wavelength, the measurement process of the few-mode optical fiber N is not interfered. This effectively improves accuracy of measuring the few-mode optical fiber N.

Figure 10:
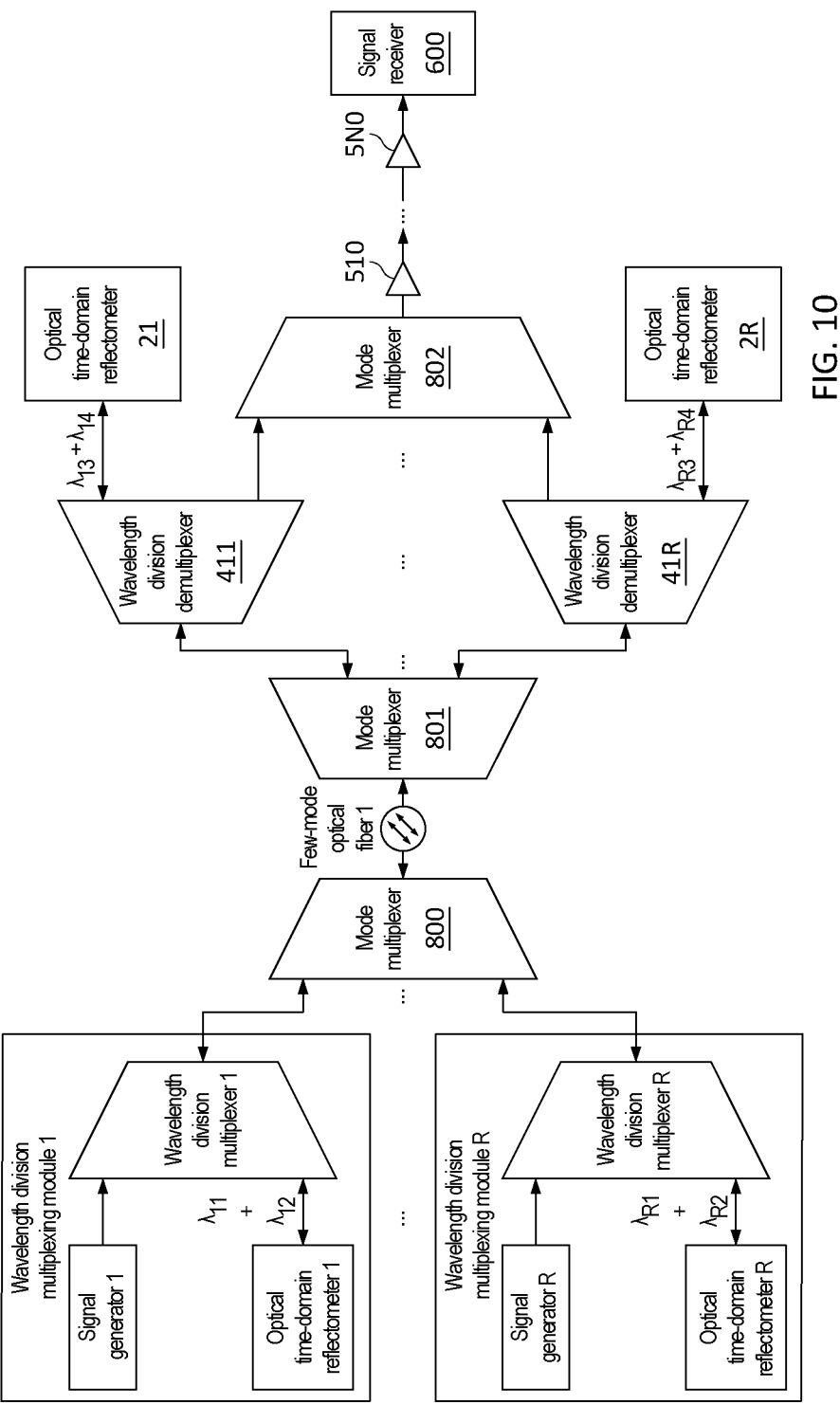
FIG. 10 is an example of a schematic diagram of an architecture of a mode division multiplexing measurement system according to an embodiment of this application.

In the optical fiber measurement solution in this application, bidirectional measurement may further be implemented on one or more modes. For example, measuring the few-mode optical fiber 1 is used as an example. FIG. 10 is an example of a schematic diagram of another mode division multiplexing measurement system according to an embodiment of this application. As shown in FIG. 10, if bidirectional measurement needs to be performed on one or more modes of the few-mode optical fiber 1, a mode multiplexer 801, R wavelength division demultiplexers 411-41R corresponding to R modes of the few-mode optical fiber 1, R optical time-domain reflectometers 21-2R that are in a one-to-one correspondence with the R wavelength division demultiplexers 411-41R, and a mode multiplexer 802 may further be disposed. The mode multiplexer 801 includes one first end and R second ends, and the mode multiplexer 802 includes R input ends and one output end. The first end of the mode multiplexer 801 is configured to connect to the other end of the few-mode optical fiber 1, and the R second ends of the mode multiplexer 801 are respectively connected to first communication ends of the R wavelength division demultiplexers 411-41R. The R optical time-domain reflectometers 21-2R are respectively connected to second communication ends of the R wavelength division demultiplexers 411-41R. Output ends of the R wavelength division demultiplexers 411-41R are respectively connected to the R input ends of the mode multiplexer 802, and the output end of the mode multiplexer 802 is connected to an optical fiber amplifier 510.

Refer to the architecture of the system shown in FIG. 10. When bidirectional measurement needs to be performed on the R modes of the few-mode optical fiber 1 simultaneously, in addition to that R optical time-domain reflectometers 1—R in R wavelength division multiplexing modules separately emit two types of measurement light rays with different wavelengths in a forward direction, the R optical time-domain reflectometers 21-2R may further separately emit two types of measurement light rays with different wavelengths in a reverse direction. In this way, the measurement light rays emitted by the R optical time-domain reflectometers 1—R in the forward direction are converted to light rays of R modes through the mode multiplexer 800 and then are coupled to the few-mode optical fiber 1 in the forward direction, so that a first target performance curve of the R modes of the few-mode optical fiber 1 may be obtained by using measurement in a direction from left to right shown in the figure based on the foregoing content. In addition, signals transmitted to the mode multiplexer 801 through the few-mode optical fiber 1 are restored to signals of fundamental modes after mode decomposition by the mode multiplexer 801. Then, signal light rays of fundamental modes in the signals are coupled to the R first ends of the mode multiplexer 802 through the corresponding wavelength division demultiplexers. The mode multiplexer 802 generates signal light rays of R modes corresponding to the signal light rays of R fundamental modes, and then sends the signal light rays of R modes to the optical fiber amplifier 510 for amplification. Then, the signal light rays of R modes are transmitted to a next optical fiber. Correspondingly, the measurement light rays emitted by the R optical time-domain reflectometers 21-2R in the reverse direction are coupled to the R second ends of the mode multiplexer 801 through the corresponding wavelength division demultiplexers 411-41R, and then are converted into light rays of R modes through the mode multiplexer 801. The light rays of R modes are coupled to the few-mode optical fiber 1 in the reverse direction and transmitted in the few-mode optical fiber 1 in a direction from right to left shown in the figure. Then, returned light rays of R modes of the few-mode optical fiber 1 are returned to the mode multiplexer 801. After mode decomposition by the mode multiplexer 801, the returned light rays of R modes are coupled to the corresponding R wavelength division demultiplexers 411-41R and then forwarded to the corresponding R optical time-domain reflectometers 21-2R. Each optical time-domain reflectometer determines, based on the returned light ray of the corresponding mode, a second target performance curve of the R modes of the few-mode optical fiber 1 obtained through measurement in a direction from right to left shown in the figure. In this way, two optical time-domain reflectometers corresponding to each mode are respectively disposed at two ends of the few-mode optical fiber 1, to implement bidirectional measurement on each mode of the few-mode optical fiber 1 and provide loss information in two directions at a same position of each mode of the few-mode optical fiber 1. This helps more accurately quantize a loss of each mode, expand an effective measurement range of each mode, and effectively improve accuracy of measuring each mode in the mode division multiplexing system.

It should be noted that the foregoing content is described only by using an example in which bidirectional measurement is performed on the R modes of the few-mode optical fiber 1 simultaneously. In another example, if only a mode of the few-mode optical fiber 1 needs to be measured, only the optical time-domain reflectometer disposed in the forward direction in the wavelength division multiplexing module corresponding to the mode may send a measurement light ray in the forward direction, and the optical time-domain reflectometer disposed in the reverse direction corresponding to the mode may send a measurement light ray in the reverse direction. Optical time-domain reflectometers in other wavelength division multiplexing modules and optical time-domain reflectometers disposed in the reverse direction may not send measurement light rays. In this way, the measurement light ray emitted by the optical time-domain reflectometer disposed in the forward direction in the wavelength division multiplexing module and the signal light ray are sent from a same direction to a side of the mode multiplexer 800. After the mode multiplexer 800 converts the light rays into light rays of a to-be-measured mode, the light rays of the to-be-measured mode are coupled to a left side of the few-mode optical fiber 1 shown in the figure, and are transmitted in the few-mode optical fiber 1 in a direction from left to right shown in the figure. The optical time-domain reflectometer in the wavelength division multiplexing module may determine, based on a returned light ray, a first target performance curve obtained through measurement in a direction from left to right shown in the figure when the few-mode optical fiber 1 transmits signals of the mode. Correspondingly, the optical time-domain reflectometer that is disposed in the reverse direction may send two types of measurement light rays of different wavelengths to the corresponding wavelength division multiplexer. After the two types of measurement light rays of different wavelengths are coupled to the mode multiplexer 801 through the wavelength division multiplexer, the mode multiplexer 801 converts the two types of measurement light rays of different wavelengths into measurement light rays of the to-be-measured mode. Then, the measurement light rays of the to-be-measured mode are coupled to a right side of the few-mode optical fiber 1 shown in the figure and are transmitted in the few-mode optical fiber 1 in a direction from right to left shown in the figure. When the measurement light rays of the mode are transmitted in the few-mode optical fiber 1, returned light rays generated are returned to the mode multiplexer 801. After mode decomposition by the mode multiplexer 801, the returned light rays are forwarded to the corresponding wavelength division demultiplexers, and then are forwarded to the corresponding optical time-domain reflectometers. The optical time-domain reflectometer obtains, based on the returned light rays of the same mode corresponding to the two types of measurement light rays, a second target performance curve measured in a direction from right to left shown in the figure when the light rays of the mode are transmitted in the few-mode optical fiber 1. With reference to the first target performance curve of the mode that is obtained through forward measurement and the second target performance curve of the mode that is obtained through reverse measurement, performance of the few-mode optical fiber 1 when light rays of the mode are transmitted in the few-mode optical fiber 1 can be accurately analyzed.

In addition, when bidirectional measurement is performed on each mode of the few-mode optical fiber 1, wavelengths of measurement light rays emitted by the two optical time-domain reflectometers located at two ends of the few-mode optical fiber 1 are different. For example, assume that the optical time-domain reflectometer R emits two measurement light rays with wavelengths 41 and 42 to measure a mode of the few-mode optical fiber 1 in a forward direction, and the optical time-domain reflectometer 2R emits two measurement light rays with wavelengths 43 and 44 to measure the mode of the few-mode optical fiber 1 in a reverse direction, and the wavelengths 41, 42, 43, and 44 are different. In this way, even if the two measurement light rays with the wavelengths 41 and 42 emitted by the optical time-domain reflectometer R enter the optical time-domain reflectometer 2R on the opposite side, the two measurement light rays with the wavelengths 41 and 42 are not used by the optical time-domain reflectometer 2R to analyze performance of the mode of the few-mode optical fiber 1 in the reverse direction because the wavelengths 41 and 42 are different from the wavelengths 43 and 44 of the two measurement light rays emitted by the optical time-domain reflectometer 2R, and vice versa. It can be learned that this wavelength setting manner helps improve accuracy of measuring a mode of the few-mode optical fiber 1 in each direction.

It should be understood that a manner of bidirectional measurement of each intermediate few-mode optical fiber from the few-mode optical fiber 2 to the few-mode optical fiber N may be implemented with reference to the foregoing manner of bidirectional measurement of the few-mode optical fiber 1. For example, if bidirectional measurement on R modes of an intermediate few-mode optical fiber needs to be implemented, R optical time-domain reflectometers in the forward direction and R optical time-domain reflectometers in the reverse direction may be respectively disposed at two ends of the intermediate few-mode optical fiber that needs to be measured with reference to a manner of disposing the R optical time-domain reflectometers 1-R in the forward direction and the R optical time-domain reflectometers 21-2R in the reverse direction in FIG. 10. For specific implementation of this part of content, refer to descriptions of the few-mode optical fiber 1 in the foregoing embodiment. Details are not described herein again.

In addition, when a few-mode optical fiber transmits signals of different modes simultaneously, weak coupling may exist between the different modes. Although signal crosstalk is generated between the signals of different modes, the signal crosstalk is not strong. The signal crosstalk may be directly ignored, or noise may be eliminated by using a manner of digital signal processing (DSP) on an optical time-domain reflectometer side. In addition, a group delay may occur when the few-mode optical fiber transmits different modes of a signal. As a result, a returned light ray obtained in same measurement duration may correspond to different optical fiber positions. A misplacement relationship between the returned light ray and the position may also be restored by using the DSP manner on the optical time-domain reflectometer side. For a specific DSP implementation, refer to an existing solution. Details are not described in this application.

It should be noted that, in the foregoing Embodiment 1 to Embodiment 4, returned light rays may include a scattered light ray and a reflected light ray, or may include other types of returned light rays. This is not specifically limited.

It is assumed that the returned light rays include a scattered light ray. The following uses the few-mode optical fiber N in FIG. 9 as an example to further describe a measurement process under different stimulated scattering effects. In this example, it is assumed that two optical time-domain reflectometers 1N1 and 1N2 and two wavelength division multiplexers 3N1 and 3N2 are disposed at an upstream end of the few-mode optical fiber N.

FIG. 11 is an example of a schematic diagram of transferring signals of different modes according to an embodiment of this application. As shown in FIG. 11, in this example, the optical time-domain reflectometer 1N1 may send a measurement light ray with a wavelength of $\lambda_{N1}$ and a measurement light ray with a wavelength of km to the wavelength division multiplexer 3N1, and $\lambda_{N1}$ and $\lambda_{N2}$ are respectively longer than and shorter than a wavelength $\lambda_{01}$ of a signal light ray transmitted from a previous few-mode optical fiber. The measurement light ray with the wavelength of $\lambda_{N1}$, the measurement light ray with the wavelength of $\lambda_{N2}$, and the signal light ray with the wavelength of $\lambda_{01}$ are combined by the wavelength division multiplexer 3N1 and then are coupled to the mode multiplexer 8N1. The optical time-domain reflectometer 1N2 may send a measurement light ray with a wavelength of $\lambda_{N3}$ and a measurement light ray with a wavelength of $\lambda_{N4}$ to the wavelength division multiplexer 3N2, and $\lambda_{N3}$ and $\lambda_{N4}$ are respectively longer than and shorter than a wavelength $\lambda_{02}$ of a signal light ray transmitted from the previous few-mode optical fiber. The measurement light ray with the wavelength of $\lambda_{N3}$, the measurement light ray with the wavelength of $\lambda_{N4}$, and the signal light ray with the wavelength of $\lambda_{02}$ are combined by the wavelength division multiplexer 3N2 and then are coupled to the mode multiplexer 8N1. The mode multiplexer 8N1 may generate one mode LP1 corresponding to the measurement light ray with the wavelength of $\lambda_{N1}$, the measurement light ray with the wavelength of $\lambda_{N2}$, and the signal light ray with the wavelength of $\lambda_{01}$, obtain a measurement light signal $LP1_{\lambda N1}$, a measurement light signal $LP1_{\lambda N2}$, and a signal light signal $LP1_{\lambda 01}$, and generate another mode LP2 corresponding to the measurement light ray with the wavelength of $\lambda_{N3}$, the measurement light ray with the wavelength of $\lambda_{N4}$, and the signal light ray with the wavelength of $\lambda_{02}$, to obtain a measurement light signal $LP2_{\lambda N3}$, a measurement light signal $LP2_{\lambda N4}$, and a signal light signal $LP1_{\lambda 02}$. Then, the four measurement light signals and two signal light signals of the two modes are coupled to the few-mode optical fiber N together.

Further, when power intensity of the measurement light ray is smaller than a threshold for generating Brillouin scattering and the measurement light signals $LP1_{\lambda N1}$, $LP1_{\lambda N2}$, $LP2_{\lambda N3}$, and $LP2_{\lambda N4}$ are transmitted in the few-mode optical fiber N, Rayleigh scattering instead of Brillouin scattering occurs. In other words, only power transfer occurs, and a wavelength offset does not occur. Therefore, after returned light signals of different modes in the few-mode optical fiber N arrive at the mode multiplexer 8N1, the mode multiplexer 8N1 performs mode decomposition on the returned light signals $LP1_{\lambda N1}$ and $LP1_{\lambda N2}$ to obtain corresponding returned light signals, and the returned light signals are returned to the optical time-domain reflectometer 1N1 through the wavelength division multiplexer 3N1, and the mode multiplexer 8N1 performs mode decomposition on the returned light signals $LP2_{\lambda N3}$ and $LP2_{\lambda N4}$ to obtain corresponding returned light signals, and the returned light signals are returned to the optical time-domain reflectometer 1N2 through the wavelength division multiplexer 3N2. The optical time-domain reflectometer 1N1 may filter out, from the returned light signals, returned light signals whose wavelengths are consistent with the wavelengths km and km of measurement light signals, determine a first Rayleigh scattering performance loss curve of the mode LP1 based on the returned light signal whose wavelength is km, determine a second Rayleigh scattering performance loss curve of the mode LP1 based on the returned light signal whose wavelength is km, and perform a weighted sum of the two Rayleigh scattering performance loss curves, to obtain a target Rayleigh scattering performance loss curve corresponding to the mode LP1. The optical time-domain reflectometer 1N2 may filter out, from the returned light signals, returned light signals whose wavelengths are consistent with the wavelengths $\lambda_{N3}$ and $\lambda_{N4}$ of measurement light signals, determine a first Rayleigh scattering performance loss curve of the mode LP2 based on the returned light signal whose wavelength is $\lambda_{N3}$, determine a second Rayleigh scattering performance loss curve of the mode LP2 based on the returned light signal whose wavelength is km, and perform a weighted sum of the two Rayleigh scattering performance loss curves, to obtain a target Rayleigh scattering performance loss curve corresponding to the mode LP2. Then, if comprehensive Rayleigh scattering performance of the few-mode optical fiber N when transmitting signals of the two modes needs to be further obtained, the target Rayleigh scattering performance loss curves of the few-mode optical fiber N when transmitting signals of the two modes may be averaged to obtain a comprehensive Rayleigh scattering performance loss curve of the few-mode optical fiber N.

When power intensity of the measurement light ray is greater than or equal to a threshold for generating Brillouin scattering and the measurement light signals $LP1_{\lambda N1}$, $LP1_{\lambda N2}$, $LP2_{\lambda N3}$, and $LP2_{\lambda N4}$ are transmitted in the few-mode optical fiber N, both Rayleigh scattering and Brillouin scattering occur. In other words, both power transfer and a wavelength offset occur. Therefore, after mode decomposition by the mode multiplexer 8N1, returned light signals of different modes in the few-mode optical fiber N are respectively returned to the optical time-domain reflectometer 1N1 and the optical time-domain reflectometer 1N2 through the wavelength division multiplexer 3N1 and the wavelength division multiplexer 3N2. The optical time-domain reflectometer 1N1 may obtain, from the returned light signals, returned light signals whose wavelengths are consistent with the wavelengths $\lambda_{N1}$ and $\lambda_{N2}$ of the measurement light signals, and obtain a target Rayleigh scattering power loss curve corresponding to a mode P1 based on the foregoing manner. The optical time-domain reflectometer 1N2 may obtain, from the returned light signals, returned light signals whose wavelengths are consistent with the wavelengths $\lambda_{N3}$ and $\lambda_{N4}$ of the measurement light signals, and obtain a target Rayleigh scattering power loss curve corresponding to a mode P2 based on the foregoing manner. Alternatively, a comprehensive Rayleigh scattering power loss curve of the few-mode optical fiber N is further obtained. In addition, the optical time-domain reflectometer 1N1 may further obtain, from the returned light rays, returned signals that have specific offsets with the wavelengths $\lambda_{N1}$ and $\lambda_{N2}$ of the measurement light signals, determine, based on the returned light signal of each wavelength that has a specific offset with the wavelength of the measurement light signal under the mode P1, a Brillouin scattering performance loss curve of each wavelength under the mode P1, and perform a weighted sum of the two Brillouin scattering performance loss curves of the wavelengths $\lambda_{N1}$ and $\lambda_{N2}$ under the mode P1, to obtain a target Brillouin scattering performance loss curve corresponding to the mode P1. The optical time-domain reflectometer 1N2 obtains, from the returned light rays, returned light signals that have specific offsets with the wavelengths $\lambda_{N3}$ and $\lambda_{N4}$ of the measurement light signals, determines, based on the returned light signal of each wavelength that has a specific offset with the wavelength of the measurement light signal under the mode P2, a Brillouin scattering performance loss curve of each wavelength under the mode P2, and performs a weighted sum of the two Brillouin scattering performance loss curves of the wavelengths $\lambda_{N3}$ and $\lambda_{N4}$ under the mode P2, to obtain a target Brillouin scattering performance loss curve corresponding to the mode P2. Then, if comprehensive Brillouin scattering performance of the few-mode optical fiber N when transmitting signals of the two modes needs to be further obtained, the target Brillouin scattering performance loss curves of the few-mode optical fiber N when transmitting signals of the two modes may be averaged to obtain a comprehensive Brillouin scattering performance loss curve of the few-mode optical fiber N.

It should be noted that a wavelength offset corresponding to the Brillouin scattering may be determined by using an experiment. An experiment process includes: Different modes of a same wavelength are excited. A frequency offset of a Brillouin scattering returned light ray of the wavelength under each mode is measured. A wavelength offset corresponding to the frequency offset is calculated based on a correlation between a frequency and a wavelength. In this way, after obtaining the returned light ray, the optical time-domain reflectometer 1N1 may determine, based on the wavelength offset of the Brillouin scattering returned light ray under the mode P1 determined by the experiment and the wavelength of the measurement light ray, an original wavelength of the returned light ray caused by Brillouin scattering, and find a returned light ray corresponding to the original wavelength from the returned light rays, to construct a Brillouin scattering performance loss curve corresponding to the mode P1. In addition, after obtaining the returned light ray, the optical time-domain reflectometer 1N2 may determine, based on the wavelength offset of the Brillouin scattering returned light ray under the mode P2 determined by the experiment and the wavelength of the measurement light ray, an original wavelength of the returned light ray caused by Brillouin scattering, and find a returned light ray corresponding to the original wavelength from the returned light rays, to construct a Brillouin scattering performance loss curve corresponding to the mode P2.

For example, when modes that need to be measured include some relatively similar modes, the relatively similar modes may further be classified into different mode sets. At least two mode sets are obtained, and the at least two mode sets are separately measured. For example, if the modes that need to be measured include a mode 1, a mode 2, a mode 3, and a mode 4, the mode 1 is relatively close to the mode 2, and the mode 3 is relatively close to the mode 4, the mode 1 and the mode 3 may be grouped into a first mode set, and the mode 2 and the mode 4 may be grouped into a second mode set (or the mode 1 and the mode 4 may be grouped into the first mode set, and the mode 2 and the mode 3 may be grouped into the second mode set). First, the two modes in the first mode set are measured to obtain a performance curve corresponding to the mode 1 and a performance curve corresponding to the mode 3, and then the two modes in the second mode set are measured to obtain a performance curve corresponding to the mode 2 and a performance curve corresponding to the mode 4. In this way, similar modes are grouped to different mode sets for separate measurement instead of being placed in a same mode set for measurement together. This reduces mutual interference between similar modes in one measurement, and further improves accuracy of optical fiber measurement.

It should be noted that, in the Embodiment 4, using a mode multiplexer to generate different modes is only an optional implementation. That the mode multiplexer must be used to generate different modes is not limited in this application. For example, in another optional implementation, different modes may alternatively be excited in an offset manner. In addition, the foregoing embodiment of this application is described merely by using single-wavelength measurement light rays as an example. However, the measurement solution may also be applicable to multi-wavelength measurement light rays. For a related execution process, directly refer to the foregoing content. Details are not described in this application again.

Based on the foregoing content, this application further provides an optical time-domain reflectometer. The optical time-domain reflectometer is connected to a first end of a wavelength division multiplexer, a second end of the wavelength division multiplexer is connected to a signal generator, and a third end of the wavelength division multiplexer is connected to an optical fiber. The optical time-domain reflectometer may be configured to perform the steps performed by any optical time-domain reflectometer in any one of the Embodiment 1 to Embodiment 4.

Based on the foregoing content, this application further provides an optical fiber measurement apparatus, including any optical time-domain reflectometer and the wavelength division multiplexer described in the foregoing content.

Based on the foregoing content, this application provides a chip. The chip may include a processor and an interface, and the processor is configured to read instructions over the interface, to perform the steps performed by any optical time-domain reflectometer in any one of the Embodiment 1 to Embodiment 4.

Based on the foregoing content, this application provides a computer-readable storage medium. The computer-readable storage medium stores a computer program. When the computer program is run, the steps performed by any optical time-domain reflectometer in any one of the Embodiment 1 to Embodiment 4 are implemented.

Based on the foregoing content, this application provides a computer program product. When the computer program product is run on a processor, the steps performed by any optical time-domain reflectometer in any one of the Embodiment 1 to Embodiment 4 are implemented.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical fiber measurement system, comprising:
   a signal generator configured to send a signal light ray, wherein the signal light ray is a multi-wavelength signal light ray;
   a first optical time-domain reflectometer configured to send a first measurement light ray and a second measurement light ray, wherein a wavelength of the first measurement light ray is longer than a maximum wavelength of the multi-wavelength signal light ray, wherein a wavelength of the second measurement light ray is shorter than a minimum wavelength of the multi-wavelength signal light ray, wherein both a wavelength difference between the wavelength of the first measurement light ray and the maximum wavelength and a wavelength difference between the minimum wavelength and the wavelength of the second measurement light ray are within a preset Raman gain range, and wherein the preset Raman gain range is a maximum wavelength difference that enables two optical signals of different wavelengths to generate an obvious stimulated Raman scattering effect; and
   a wavelength-division multiplexer configured to:
      receive the signal light ray from the signal generator;
      receive the first measurement light ray and the second measurement light ray from the first optical time-domain reflectometer;
      combine the first measurement light ray, the second measurement light ray, and the signal light ray to obtain a combined light ray;
      send the combined light ray to an optical fiber; and
      send a returned light ray from the optical fiber to the first optical time-domain reflectometer, wherein the returned light ray is based on the combined light ray, and wherein the first optical time-domain reflectometer is further configured to determine a performance of the optical fiber based on the returned light ray.

2. The optical fiber measurement system of claim 1, wherein the first optical time-domain reflectometer comprises:
   a processor; and
   a splitter configured to:
      split the returned light ray into a first returned light ray corresponding to the first measurement light ray and a second returned light ray corresponding to the second measurement light ray; and send the first returned light ray and the second returned light ray to the processor, wherein the processor is configured to:

receive the first returned light ray and the second returned light ray from the splitter; and determine performance of the optical fiber based on the first returned light ray and the second returned light ray.

3. The optical fiber measurement system of claim 2, wherein a wavelength difference between the wavelength of the first measurement light ray and a center wavelength of the multi-wavelength signal light ray is the same as a wavelength difference between the center wavelength of the multi-wavelength signal light ray and the wavelength of the second measurement light ray.

4. The optical fiber measurement system of claim 2, wherein the processor is further configured to:

obtain a first performance curve of the optical fiber based on the first returned light ray;

obtain a second performance curve of the optical fiber based on the second returned light ray; and perform a weighted sum of the first performance curve and the second performance curve to obtain a target performance curve of the optical fiber.

5. The optical fiber measurement system of claim 4, wherein a ratio of a weight corresponding to the first performance curve to a weight corresponding to the second performance curve is positively correlated with a ratio of a first frequency difference to a second frequency difference, wherein the first frequency difference is between a frequency of the multi-wavelength signal light ray and a frequency of the first measurement light ray, and wherein the second frequency difference is between a frequency of the second measurement light ray and the frequency of the multi-wavelength signal light ray.

6. The optical fiber measurement system of claim 1, wherein the signal generator comprises K signal generation units, wherein the K signal generation units are in a one-to-one correspondence with K bands, wherein K is a positive integer greater than or equal to 2, and wherein each of the K signal generation units is configured to send a multi-wavelength signal light ray in a corresponding band to the wavelength-division multiplexer.

7. The optical fiber measurement system of claim 1, further comprising a wavelength-division demultiplexer and a second optical time-domain reflectometer connected to the wavelength-division demultiplexer, wherein the wavelength-division multiplexer and the wavelength-division demultiplexer are respectively located at two ends of the optical fiber, wherein the second optical time-domain reflectometer is configured to send a third measurement light ray and a fourth measurement light ray to the wavelength-division demultiplexer, wherein a wavelength of the third measurement light ray and a wavelength of the fourth measurement light ray are respectively longer than and shorter than the wavelength of the multi-wavelength signal light ray, wherein the wavelength-division demultiplexer is configured to:

send the third measurement light ray and the fourth measurement light ray to the optical fiber; and send a returned light ray from the optical fiber to the second optical time-domain reflectometer, and wherein the second optical time-domain reflectometer is further configured to determine performance of the optical fiber in another direction based on the returned light ray.

8. The optical fiber measurement system of claim 7, wherein wavelengths of the first measurement light ray, the second measurement light ray, the third measurement light ray, and the fourth measurement light ray are different.

9. The optical fiber measurement system of claim 7, further comprising an optical fiber amplifier, wherein an input end of the optical fiber amplifier is connected to an output end of a previous optical fiber, wherein an output end of the optical fiber amplifier is connected to a second wavelength-division multiplexer, and wherein the optical fiber amplifier is configured to:

amplify power of a signal light ray from the previous optical fiber to obtain an amplified signal light ray; and send the amplified signal light ray to the second wavelength-division multiplexer.

10. The optical fiber measurement system of claim 9, wherein the optical fiber amplifier comprises at least two amplifiers, wherein an input end of the wavelength-division demultiplexer is connected to the output end of the previous optical fiber, wherein at least two output ends of the wavelength-division demultiplexer are respectively connected to input ends of the at least two amplifiers, wherein output ends of the at least two amplifiers are connected to the wavelength-division multiplexer, wherein the wavelength-division demultiplexer is configured to:

split the signal light ray from the previous optical fiber into optical signals in at least two bands; and respectively send the optical signals in the at least two bands to the at least two amplifiers; and wherein the at least two amplifiers are configured to:

amplify powers of the optical signals in the at least two bands to obtain amplified optical signals; and send the amplified optical signals to the wavelength-division multiplexer.

11. The optical fiber measurement system of claim 1, wherein the optical fiber is a multi-core optical fiber, wherein the optical fiber measurement system further comprises a plurality of first optical time-domain reflectometers and a plurality of wavelength-division multiplexers, wherein the wavelength-division multiplexers are in a one-to-one correspondence with fiber cores of the multi-core optical fiber, wherein the wavelength-division multiplexers are in a one-to-one correspondence with the first optical time-domain reflectometers, wherein the optical fiber measurement system further comprises a first fan-in/fan-out device configured to:

connect the wavelength-division multiplexers and the multi-core optical fiber;

send light rays combined by the wavelength-division multiplexers to fiber cores corresponding to the wavelength-division multiplexers; and send light rays returned by the fiber cores to the wavelength-division multiplexers corresponding to the fiber cores, wherein the corresponding wavelength-division multiplexer is configured to send a received light ray from the corresponding fiber core to a corresponding first optical time-domain reflectometer, and wherein the corresponding first optical time-domain reflectometer is further configured to determine a performance of a corresponding fiber core in the fiber cores based on the light ray from the corresponding fiber core.

12. The optical fiber measurement system of claim 11, further comprising a wavelength-division demultiplexer and a second optical time-domain reflectometer, wherein there are a plurality of wavelength-division demultiplexers and a plurality of second optical time-domain reflectometers, wherein the plurality of wavelength-division demultiplexers are in a one-to-one correspondence with the fiber cores of the multi-core optical fiber, wherein the plurality of second optical time-domain reflectometers are in a one-to-one correspondence with the plurality of wavelength-division demultiplexers, wherein the optical fiber measurement system further comprises a second fan-in/fan-out device configured to connect the plurality of wavelength-division demultiplexers and the multi-core optical fiber, wherein the corresponding second optical time-domain reflectometer is configured to send two measurement light rays whose wavelengths are longer than and shorter than the wavelength of the multi-wavelength signal light ray to the corresponding wavelength-division demultiplexer, wherein the corresponding wavelength-division demultiplexer is configured to send the two measurement light rays from the corresponding second optical time-domain reflectometer to the second fan-in/fan-out device, wherein the second fan-in/fan-out device is configured to:

couple the two measurement light rays from the wavelength-division demultiplexer to a fiber core corresponding to the wavelength-division multiplexer; and send light rays returned by the fiber cores to the wavelength-division demultiplexers corresponding to the fiber cores, wherein the corresponding wavelength-division demultiplexer is further configured to send a received light ray returned by the fiber core to a corresponding second optical time-domain reflectometer, and wherein the second optical time-domain reflectometer is further configured to determine performance of a corresponding fiber core in the fiber cores in another direction based on the light ray returned by the fiber core.

13. The optical fiber measurement system of claim 1, wherein the optical fiber is a few-mode optical fiber, wherein there are a plurality of first optical time-domain reflectometers and a plurality of wavelength-division multiplexers, wherein the plurality of wavelength-division multiplexers are in a one-to-one correspondence with a plurality of modes of the few-mode optical fiber, wherein the plurality of wavelength-division multiplexers are in a one-to-one correspondence with the plurality of first optical time-domain reflectometers, wherein the optical fiber measurement system further comprises a first mode multiplexer configured to:

connect the plurality of wavelength-division multiplexers and the few-mode optical fiber;

convert light rays combined by the plurality of wavelength-division multiplexers into light rays of different modes;

send the light rays of different modes to the few-mode optical fiber; and send light rays of different modes returned by the few-mode optical fiber after mode decomposition to a corresponding wavelength-division multiplexer, and wherein the first optical time-domain reflectometer is further configured to determine performance of a corresponding mode of the few-mode optical fiber based on the light ray returned after mode decomposition.

14. The optical fiber measurement system of claim 13, further comprising a wavelength division demultiplexer and a second optical time-domain reflectometer, and wherein there are a plurality of wavelength-division demultiplexers and a plurality of second optical time-domain reflectometers, wherein the plurality of wavelength-division demultiplexers are in a one-to-one correspondence with a plurality of modes of the few-mode optical fiber, wherein the plurality of second optical time-domain reflectometers are in a one-to-one correspondence with the plurality of wavelength-division demultiplexers, wherein the optical fiber measurement system further comprises a second mode multiplexer configured to connect the plurality of wavelength-division demultiplexers and the few-mode optical fiber, wherein the corresponding second optical time-domain reflectometer is configured to send two measurement light rays whose wavelengths are longer than and shorter than the wavelength of the multi-wavelength signal light ray to the corresponding wavelength-division demultiplexer, wherein the wavelength-division demultiplexer is configured to send the two measurement light rays from the corresponding second optical time-domain reflectometer to the second mode multiplexer, wherein the second mode multiplexer is configured to:

convert the two measurement light rays from the plurality of wavelength-division demultiplexers into light rays of different modes;

send the light rays of different modes to the few-mode optical fiber; and send light rays of different modes returned by the few-mode optical fiber after mode decomposition to a corresponding wavelength-division demultiplexers, wherein the wavelength-division demultiplexer is further configured to send a received returned light ray after mode decomposition corresponding to a mode to a corresponding second optical time-domain reflectometer, and wherein the second optical time-domain reflectometer is further configured to determine performance of the corresponding mode of the few-mode optical fiber in another direction based on the light ray returned after mode decomposition.

15. The optical fiber measurement system of claim 1, wherein the returned light ray comprises a Rayleigh scattering light ray or a Brillouin scattering light ray when the combined light ray is transmitted in the optical fiber.

16. An optical fiber measurement method, comprising:

sending, by a signal generator, a signal light ray to a wavelength-division multiplexer, wherein the signal light ray is a multi-wavelength signal light ray;

sending, by a first optical time-domain reflectometer, a first measurement light ray and a second measurement light ray to the wavelength-division multiplexer, wherein a wavelength of the first measurement light ray is longer than a maximum wavelength of the multi-wavelength signal light ray, wherein a wavelength of the second measurement light ray shorter than a minimum wavelength of the signal light ray, wherein both a wavelength difference between the wavelength of the first measurement light ray and the maximum wavelength and a wavelength difference between the minimum wavelength and the wavelength of the second measurement light ray are within a preset Raman gain range, and wherein the preset Raman gain range is a maximum wavelength difference that enables two optical signals of different wavelengths to generate an obvious stimulated Raman scattering effect;

combining, by the wavelength-division multiplexer, the first measurement light ray, the second measurement light ray, and the signal light ray to obtain a combined light ray;

sending, by the wavelength-division multiplexer, the combined light ray to an optical fiber;

sending, by the wavelength-division multiplexer, a returned light ray from the optical fiber to the first optical time-domain reflectometer, wherein the returned light ray is based on the combined light ray; and determining, by the first optical time-domain reflectometer, a performance of the optical fiber based on the returned light ray.

17. The optical fiber measurement method of claim 16, wherein the returned light ray comprises a Rayleigh scattering light ray when the combined light ray is transmitted in the optical fiber.

18. The optical fiber measurement method of claim 16, wherein the returned light ray comprises a Brillouin scattering light ray when the combined light ray is transmitted in the optical fiber.

19. An optical fiber measurement system, comprising:

a signal generator configured to send a signal light ray;

a first optical time-domain reflectometer configured to send a first measurement light ray and a second measurement light ray, wherein a wavelength of the first measurement light ray and a wavelength of the second measurement light ray are respectively longer than and shorter than a wavelength of the signal light ray;

a wavelength-division multiplexer configured to:

receive the signal light ray from the signal generator;

receive the first measurement light ray and a second measurement light ray from the first optical time-domain reflectometer;

combine the first measurement light ray, the second measurement light ray, and the signal light ray to obtain a combined light ray;

send the combined light ray to an optical fiber; and send a returned light ray from the optical fiber to the first optical time-domain reflectometer, wherein the returned light ray is based on the combined light ray, and wherein the first optical time-domain reflectometer is further configured to determine a performance of the optical fiber based on the returned light ray; and a wavelength-division demultiplexer and a second optical time-domain reflectometer connected to the wavelength-division demultiplexer, wherein the wavelength-division multiplexer and the wavelength-division demultiplexer are respectively located at two ends of the optical fiber, wherein the second optical time-domain reflectometer is configured to send a third measurement light ray and a fourth measurement light ray to the wavelength-division demultiplexer, wherein a wavelength of the third measurement light ray and a wavelength of the fourth measurement light ray are respectively longer than and shorter than the wavelength of the signal light ray, wherein the wavelength-division demultiplexer is configured to:

send the third measurement light ray and the fourth measurement light ray to the optical fiber; and send a returned light ray from the optical fiber to the second optical time-domain, wherein the second optical time-domain reflectometer is further configured to determine performance of the optical fiber in another direction based on the returned light ray, and wherein wavelengths of the first measurement light ray, the second measurement light ray, the third measurement light ray, and the fourth measurement light ray are different.

20. The optical fiber measurement system of claim 19, further comprising an optical fiber amplifier, wherein an input end of the optical fiber amplifier is connected to an output end of a previous optical fiber, wherein an output end of the optical fiber amplifier is connected to the wavelength-division multiplexer, and wherein the optical fiber amplifier is configured to:

amplify power of a signal light ray from the previous optical fiber to obtain an amplified signal light ray; and send the amplified signal light ray to the wavelength-division multiplexer.

* * * * *